(12) United States Patent
Mori et al.

(10) Patent No.: US 6,392,984 B2
(45) Date of Patent: May 21, 2002

(54) INFORMATION STORING DISK, REPRODUCTION APPARATUS, AND REPRODUCTION METHOD

(75) Inventors: Yoshihiro Mori, Hirakata; Masayuki Kozuka, Neyagawa; Masatoshi Shimbo, Mino; Tadashi Abe, Yawata, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/794,926

(22) Filed: Feb. 26, 2001

Related U.S. Application Data

(63) Continuation of application No. 09/172,576, filed on Oct. 14, 1998, now Pat. No. 6,222,806.

(30) Foreign Application Priority Data

Oct. 15, 1997 (JP) ............................................... 9-282140

(51) Int. Cl.[7] ................................................. G11B 7/00
(52) U.S. Cl. ............................... 369/275.3; 369/47.15; 369/47.1; 369/53.41
(58) Field of Search ............................ 369/47.1, 47.13, 369/47.15, 47.16, 47.2, 47.21, 47.22, 47.23, 53.1, 53.15, 53.2, 53.41, 53.44, 59.1, 59.14, 59.25, 275.1, 275.3

(56) References Cited

U.S. PATENT DOCUMENTS

| | | | |
|---|---|---|---|
| 5,530,686 A | | 6/1996 | Schylander et al. |
| 5,625,611 A | * | 4/1997 | Yokota et al. ........... 369/47.12 |
| 5,719,837 A | | 2/1998 | Aramaki |

FOREIGN PATENT DOCUMENTS

| | | |
|---|---|---|
| DE | 19544785 | 6/1996 |
| EP | 0630021 | 12/1994 |
| EP | 0795870 | 9/1997 |
| EP | 0855715 | 7/1998 |
| WO | 9301593 | 1/1993 |
| WO | 9822946 | 5/1998 |

OTHER PUBLICATIONS

International Search Report for Application No. PCT/JP98/04636; Mailed on Mar. 1, 1999.

* cited by examiner

*Primary Examiner*—Muhammad Edun
(74) *Attorney, Agent, or Firm*—Renner, Otto, Boisselle & Sklar

(57) ABSTRACT

An information storing disk including at least one system stream stored thereon. The at least one system stream includes a silent cell for defining a silent period and an audio cell for defining audio data to be reproduced after the silent period. The silent period is a period to be silent, which is from when one system stream to be reproduced among at least one system stream is determined until reproduction of an audio cell included in the one system stream is started.

10 Claims, 26 Drawing Sheets

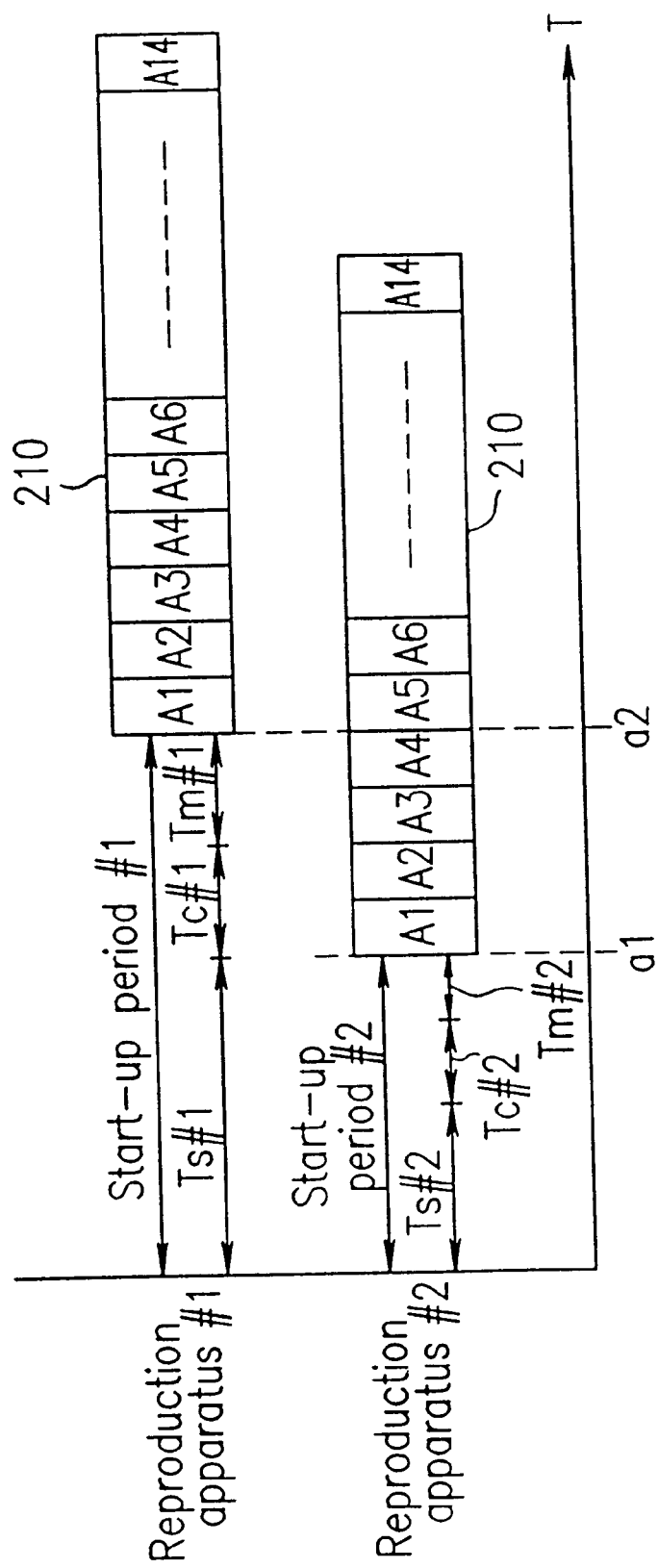

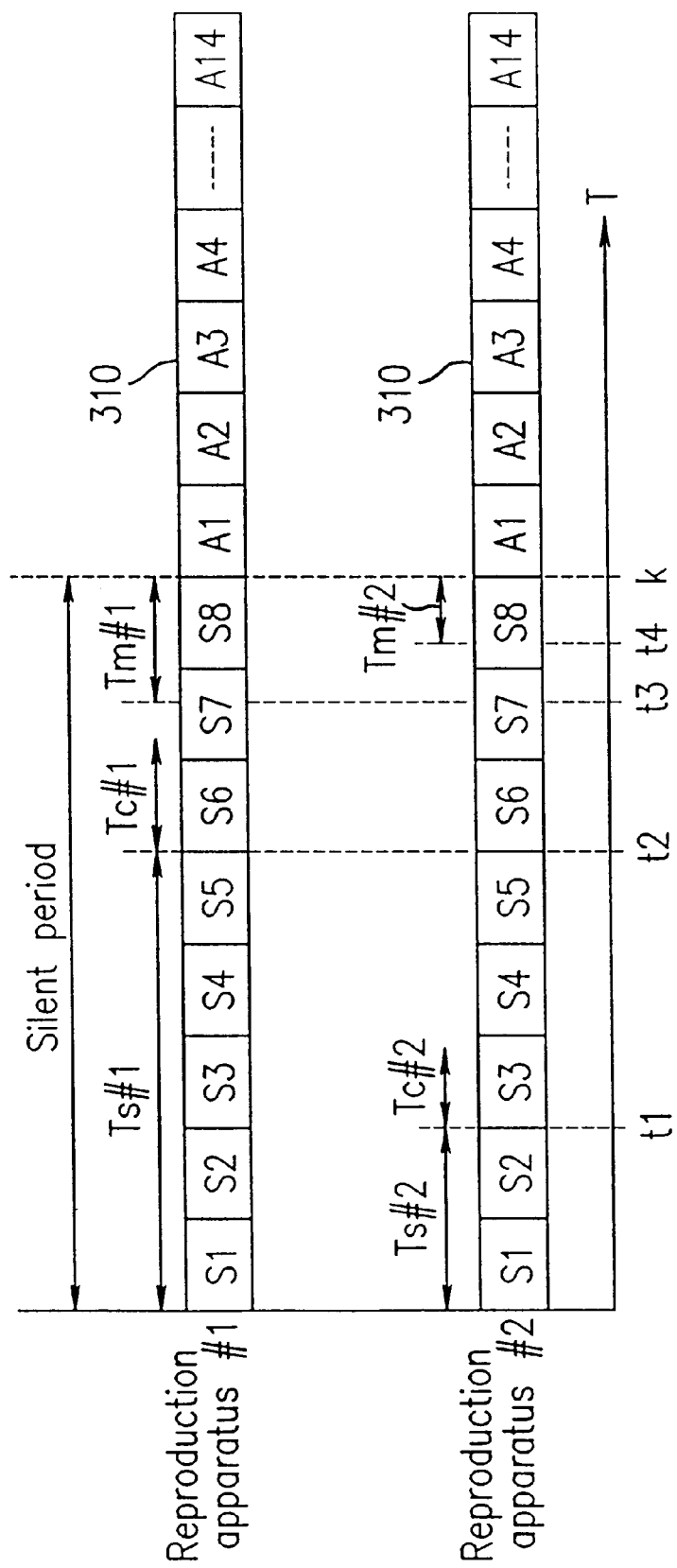

FIG.15

| | Physical allocation information | Time attribute information | Start cell time | Still picture flag | Reproduction start audio time | Program reproduction time period | Audio pause time period |
|---|---|---|---|---|---|---|---|
| Program #1 | No-Continue | No-Continue | 1 | Exist | 90,000 | 5,490,000 | 90,000 |
| Program #2 | Continue | Continue | 4 | Exist | 5,580,000 | 10,890,000 | 90,000 |
| Program #3 | No-Continue | No-Continue | 8 | none | 90,000 | 5,490,000 | 90,000 |
| Program #4 | Continue | Continue | 10 | none | 5,580,000 | 5,490,000 | 90,000 |
| Program #5 | Continue | Continue | 12 | none | 11,160,000 | 5,400,000 | 0 |

FIG.16

|  | Cell index | Cell type | Start address | Termination address |
|---|---|---|---|---|
| Cell #1 | 0 | Still | 26,592 | 26,703 |
| Cell #2 | 0 | Silent | 26,704 | 26,799 |
| Cell #3 | 1 | Audio | 26,800 | 32,559 |
| Cell #4 | 0 | Still | 32,560 | 32,671 |
| Cell #5 | 0 | Silent | 32,672 | 32,767 |
| Cell #6 | 1 | Audio | 32,768 | 38,527 |
| Cell #7 | 2 | Audio | 38,528 | 44,287 |
| Cell #8 | 0 | Silent | 0 | 95 |
| Cell #9 | 1 | Audio | 96 | 14,975 |
| Cell #10 | 0 | Silent | 14,976 | 15,071 |
| Cell #11 | 1 | Audio | 15,072 | 20,831 |
| Cell #12 | 2 | Audio | 20,832 | 26,591 | though
INFORMATION STORING DISK, REPRODUCTION APPARATUS, AND REPRODUCTION METHOD This application is a continuation of Ser. No. 09/172,576 filed Oct. 14, 1998 now U.S. Pat. No. 6,222,806.

BACKGROUND OF THE INVENTION

1. Field of the Invention

The present invention relates to an information storing disk for storing a system stream, and an apparatus and a method for reproducing the system stream from the information storing disk. In particular, the present invention relates to an information storing disk for allowing a plurality of reproduction apparatuses having different levels of performance, such as data processing speed, to have the same wait time before the reproduction of the system stream starts, and an apparatus and a method for reproducing the system stream from the information storing disk.

2. Description of the Related Art

Conventionally known optical disks for storing audio information and moving picture information to be reproduced therefrom include compact disks (CDs) and laser disks (LDs).

A CD is an optical disk having a diameter of 12 cm and stores digital data obtained by encoding music information using an encoding technology referred to as linear PCM. CDs have been utilized as a medium for storing digital data for music applications.

An LD is an optical disk having a diameter of 30 cm and stores moving picture information, along with audio information, in the form of analog signals. LDs have been utilized as a medium for storing analog data for video applications such as movies.

Recently, new types of optical disks have been introduced. One of such new types of optical disks is an optical disk having a diameter of about 12 cm which realizes long-time recording/storing and a sufficiently high quality by efficient compression of music information and/or moving picture information including audio information. Another type of optical disk has a file structure with which data transmission with computers and communication devices is performed relatively easily.

Under such circumstances, an information storing medium which realizes storing and reproduction of audio data with a higher quality than compact disks have been demanded. As such an information storing medium, an optical disk in conformity with the DVD-Video format have been developed and implemented. Such an optical disk realizes storing and reproduction of audio data of a high quality of linear PCM, 96 kHz·24-bit sampling. However, with the DVD-Video format, it is impossible to reproduce high quality linear PCM multi-surround audio information or higher quality audio information.

High quality audio data contains a large amount of data and thus requires a high data transfer speed of audio data.

The present inventors have found, through many years of research and development on optical disks for storing high quality audio data, that the wait time before the start of reproduction of high quality audio data causes various problems.

Before the start of reproduction of information stored on an optical disk, the wait time is required, which is the time period from when one system stream to be reproduced among one or more system streams stored on the optical disk is determined until the reproduction of the one system stream is started. The wait time is also referred to as the "start-up period". A plurality of reproduction apparatuses having different levels of performance, such as data processing speed, usually have different start-up periods.

In the case of, for example, high quality audio data having a stream structure of the MPEG format, the start-up period includes time period $T_s$, time period $T_c$, and time period $T_m$. Time period $T_s$ is a period required for the reproduction apparatus to seek to the position, on the optical disk, storing the audio data. Time period $T_c$ is a period from when the audio data is input to a decoder until the first correct decoded audio data is output from the decoder. Time period $T_c$ includes a period for adjusting output timing of a system stream with reference to a PTS (Presentation Time Stamp) included in the system stream and a period for examining whether or not the audio data included in the system stream is correct. Time period $T_m$ is a period for transition of a muting circuit in an analog output section from a mute state to a non-mute state.

In the case where a system decoder and an audio decoder are accommodated in separate chassis or mounted on separate LSIs, the start-up period is further extended because adjustment of the output timing based on the PTS and the examination on whether or not the audio data is correct need to be performed separately.

When the start-up period is extended, malfunction that the output timing for the system stream is not properly adjusted may undesirably occur in a specific reproduction apparatus and thus the leading audio data in the system stream is not reproduced.

When a plurality of reproduction apparatuses have different start-up periods, the inter-tune interval of an optical disk varies in accordance with the reproduction apparatus used. In such case, disk creators cannot uniformly set the inter-tune interval, which is significantly disadvantageous to the disk creators and users.

SUMMARY OF THE INVENTION

According to one aspect of the invention, an information storing disk includes at least one system stream stored thereon. The at least one system stream includes a silent cell for defining a silent period and an audio cell for defining audio data to be reproduced after the silent period. The silent period is a period to be silent, which is from when one system stream to be reproduced among at least one system stream is determined until reproduction of an audio cell included in the one system stream is started.

In one embodiment of the invention, the silent period includes a period required by a reproduction apparatus after one system stream to be reproduced among at least one system stream is determined until reproduction of the one system stream is started.

In one embodiment of the invention, the information storing disk further includes information indicating the order of reproducing a plurality of system streams. The silent period is a period to be silent, which is from when reproduction of one of the plurality of system streams is terminated until reproduction of an audio cell included in the next system stream is started.

In one embodiment of the invention, the silent cell and the audio cell each include audio data encoded in an identical encode mode, and an output level of the audio data included in the silent cell is substantially zero.

In one embodiment of the invention, the system stream includes a time stamp for defining output timing at a prescribed interval, a presentation period of the audio cell is determined based on a difference between a first time stamp and a final time stamp included in the audio cell, and the silent period is determined based on a difference between a first time stamp and a final time stamp included in the silent cell.

According to another aspect of the invention, a reproduction apparatus for reproducing information stored on an information storing disk is provided. The information storing disk including at least one system stream stored thereon. The at least one system stream includes a silent cell for defining a silent period and an audio cell for defining audio data to be reproduced after the silent period. The silent period is a period to be silent, which is from when one system stream to be reproduced among at least one system stream is determined until reproduction of an audio cell included in the one system stream is started. The reproduction apparatus includes a reading section for reading a system stream to be reproduced among the at least one system stream stored on the information storing disk, and a reproduction section for reproducing a part of the silent cell and reproducing the audio cell, from a point in the silent cell included in the read system stream.

In one embodiment of the invention, the silent period includes a period required by a reproduction apparatus after one system stream to be reproduced among at least one system stream is determined until reproduction of the one system stream is started.

In one embodiment of the invention, the information storing disk further includes information indicating the order of reproducing a plurality of system streams. The silent period is a period to be silent, which is from when reproduction of one of the plurality of system streams is terminated until reproduction of an audio cell included in the next system stream is started.

In one embodiment of the invention, the silent cell and the audio cell each include audio data encoded in an identical encode mode, and an output level of the audio data included in the silent cell is substantially zero.

In one embodiment of the invention, the system stream includes a time stamp for defining output timing at a prescribed interval, a presentation period of the audio cell is determined based on a difference between a first time stamp and a final time stamp included in the audio cell, and the silent period is determined based on a difference between a first time stamp and a final time stamp included in the silent cell.

According to still another aspect of the invention, a reproduction method for reproducing information stored on an information storing disk is provided. The information storing disk includes at least one system stream stored thereon. The at least one system stream includes a silent cell for defining a silent period and an audio cell for defining audio data to be reproduced after the silent period. The silent period is a period to be silent, which is from when one system stream to be reproduced among at least one system stream is determined until reproduction of an audio cell included in the one system stream is started. The reproduction method includes the steps of reading a system stream to be reproduced among the at least one system stream stored on the information storing disk, and reproducing a part of the silent cell and reproducing the audio cell, from a point in the silent cell included in the read system stream.

In one embodiment of the invention, the silent period includes a period required by a reproduction apparatus after one system stream to be reproduced among at least one system stream is determined until reproduction of the one system stream is started.

In one embodiment of the invention, the information storing disk further includes information indicating the order of reproducing a plurality of system streams. The silent period is a period to be silent, which is from when reproduction of one of the plurality of system streams is terminated until reproduction of an audio cell included in the next system stream is started.

In one embodiment of the invention, the silent cell and the audio cell each include audio data encoded in an identical encode mode, and an output level of the audio data included in the silent cell is substantially zero.

In one embodiment of the invention, the system stream includes a time stamp for defining output timing at a prescribed interval, a presentation period of the audio cell is determined based on a difference between a first time stamp and a final time stamp included in the audio cell, and the silent period is determined based on a difference between a first time stamp and a final time stamp included in the silent cell.

Thus, the invention described herein makes possible the advantages of providing an information storing disk for allowing a plurality of reproduction apparatuses having different levels of performance, such as data processing speed, to have an equal wait time (start-up period) before the reproduction of a system steam starts, and an apparatus and a method for reproducing the system stream from the information storing disk.

These and other advantages of the present invention will become apparent to those skilled in the art upon reading and understanding the following detailed description with reference to the accompanying figures.

BRIEF DESCRIPTION OF THE DRAWINGS

FIG. 2B shows timing for reproducing the system stream 210;

FIG. 4B shows timing for reproducing the system stream 310;

FIG. 15 shows an example of a program information;

FIG. 16 shows an example of cell information;

DESCRIPTION OF THE PREFERRED EMBODIMENTS

Hereinafter, the present invention will be described by way of illustrative examples with reference to the accompanying drawings.

EXAMPLE 1

Figure 1:
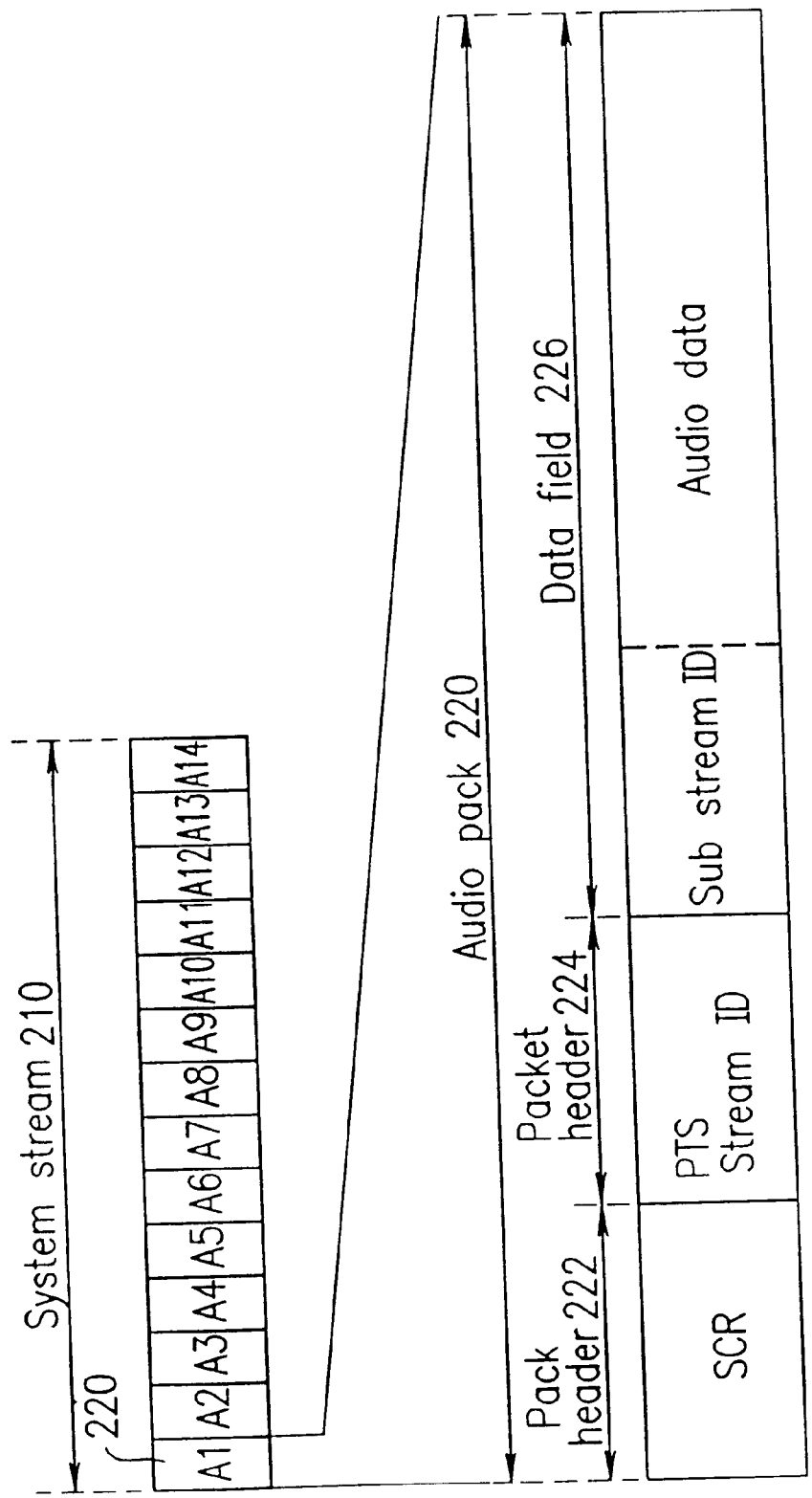
FIG. 1 shows a data structure of a system stream 210 in conformity with the MPEG format.

FIG. 1 shows a data structure of a system stream 210 in conformity with the MPEG format. An optical disk can include at least one system stream 210 stored thereon.

The system stream 210 can include a plurality of elementary streams. The elementary streams are classified into a video elementary stream for storing moving picture information and an audio elementary stream for storing audio information. Each of the plurality of elementary streams is divided into a plurality of packs. Each of the plurality of packs has a length of 2 Kbytes.

In the example shown in FIG. 1, the system stream 210 is formed of one audio elementary stream. The system stream 210 includes a plurality of audio packs 220. The plurality of audio packs 220 are respectively represented by denotations A1 through A14.

Each of the plurality of audio packs 220 includes a pack header 222, a packet header 224 and a data field 226.

In the pack header 222, data in conformity with the MPEG format such as, for example, a pack start code, an SCR (System Clock Reference) and an MUX (multiplex) rate are described.

In the packet header 224, data in conformity with the MPEG format such as, for example, a stream ID, a packet length, an STD (System Target Decoder) buffer scale size, and a PTS (Presentation Time Stamp) are described. The packet header 224 includes an area for storing a DTS (Decoding Time Stamp) which defines decoding timing of data as required by the MPEG format, but such an area is not used for audio elementary stream.

The stream ID described in the packet header 224 is a code indicating the type of data stored in the data field 226. For example, when the data stored in the data field 226 is audio data, code "10111101" is described in the packet header 224 as the stream ID.

A sub stream ID is described in the first eight bits of the data field 226. The upper five bits of the eight bits of the sub stream ID indicate an encode type. The encode format can be LPCM, AC3, DTS, or the like. The lower three bits of the eight bits of the sub stream ID indicate an identification number of the sub stream. The identification number is any one of 0 through 7. A system stream can include a maximum of 8 audio elementary streams. The maximum of 8 audio elementary streams can be identified using the identification numbers.

The SCR in the pack header 222 and the PTS in the packet header 224 are used for adjusting the synchronization between decoding of the audio pack and decoding of a sub video pack.

Figure 2A:
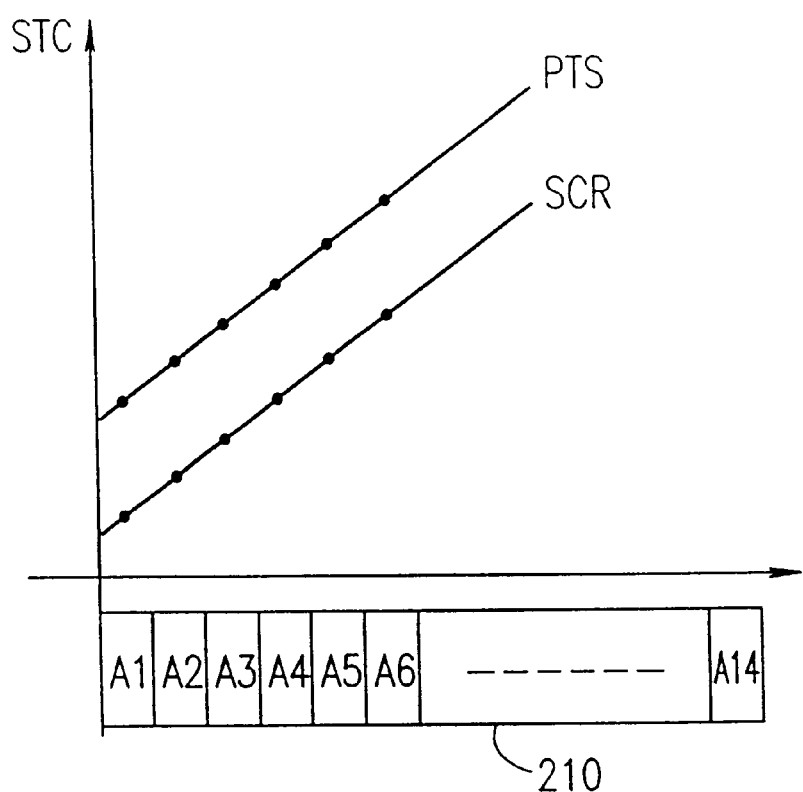
FIG. 2A shows the relationship between the audio packs A1 through A6, and the SCR and PTS included in each of the audio packs A1 through A6.

FIG. 2A shows the relationship between the system stream 210 including the plurality of audio packs A1 through A6, and the SCR and the PTS included in each of the audio packs A1 through A6.

When a reproduction apparatus reproduces the system stream 210 stored on the optical disk, the reproduction apparatus sets the SCR included in the leading audio pack A1 in the system stream 210 as an initial value of an STC (System Time Clock), which is a reference clock. Then, the reproduction apparatus inputs the audio packs A2 through A6 following the audio pack A1 to a decoder at the timing indicated by the SCR with reference to the STC. The decoder decodes the input audio packs. The decoded audio packs are externally output from the decoder at the timing indicated by the PTS.

The present inventors analyzed problems which can occur when high quality audio data is reproduced using the data structure of the system stream shown in FIG. 1 and the reproduction method shown in FIG. 2A. The results of analysis will be described below.

The inventors have noticed that the timing for initiating the STC (i.e., the timing for resetting the STC) should be a point of attention. As described above, in accordance with the reproduction method shown in FIG. 2A, the STC is reset when the leading audio pack A1 in the system stream 210 is reproduced. Before the reproduction of the leading audio pack A1 starts, a wait time for preparing for the reproduction is required. Since the wait time varies in accordance with the processing capability of the reproduction apparatus used, the time for reproducing the leading audio pack A1 varies in accordance with the type of reproduction apparatus. As a result, the time for resetting the STC also undesirably varies in accordance with the type of reproduction apparatus.

This point will be described in more detail.

Reproduction of information stored on an optical disk requires a wait time from when one system stream to be reproduced among one or more system steams stored on the optical disk is determined until the reproduction of the one system stream is started. The wait time varies in accordance with the capability of the reproduction apparatus, and generally tends to be shorter in higher-level apparatuses and longer in lower-level apparatuses. The wait time is also referred to as the "start-up period".

In the case of, for example, high quality audio data having a stream structure of the MPEG format, the start-up period includes time period $T_s$, time period $T_c$, and time period $T_m$. Time period $T_s$ is a period required for the reproduction apparatus to seek to a position, on the optical disk, storing the audio data. Time period $T_c$ is a period from when the audio data is input to a decoder until the decoded audio data is output from the decoder. Time period $T_c$ includes a period for adjusting output timing of a system stream with reference to a PTS included in the system stream and a period for examining whether or not the audio data included in the system stream is correct. Since the examination on the audio data is usually performed before the audio data is output in accordance with the PTS, time period $T_c$ equals to a period obtained by subtracting the SCR from the PTS. Time period $T_m$ is a period for transition of a muting circuit in an analog output section from a mute state to a non-mute state.

A plurality of reproduction apparatuses having different levels of performance, such as data processing speed, have different start-up periods because time period $T_s$, time period $T_c$, and time period $T_m$ vary in accordance with the type of reproduction apparatus.

For example, reproduction apparatuses commercially available currently have time period $T_s$ (seek period) of several ten milliseconds to about 500 milliseconds. However, time period $T_s$ depends on, for example, the torque of a motor for rotating the optical disk mounted on the reproduction apparatus. Accordingly, there can be reproduction apparatuses having time period $T_s$ of a maximum of several seconds. As can be appreciated from these values, time period $T_s$ varies by the order of several hundred milliseconds in accordance with the type of reproduction apparatus.

Time period $T_c$ depends on the algorithm adopted by the reproduction apparatus for decoding. Time period $T_c$ varies by the order of several hundred milliseconds in accordance with the type of adopted algorithm.

Time period $T_m$ also varies by the order of several hundred milliseconds in accordance with the performance of the circuit mounted on the reproduction apparatus.

FIG. 2B shows the timing for starting the reproduction of the same system stream 210 in two reproduction apparatuses #1 and #2 of different types.

Reproduction apparatus #1 has a lower level of performance than that of reproduction apparatus #2. Reproduction of the system stream 210 by reproduction apparatus #1 requires a longer start-up period than reproduction of the system stream 210 by reproduction apparatus #2. In other words, start-up period #1>start-up period #2.

In reproduction apparatus #1, after start-up period #1, the STC is reset based on the SCR of the leading audio pack A1 at time a2. As a result, the reproduction of the system stream 210 starts at time a2. In contrast in reproduction apparatus #2, after start-up period #2, the STC is reset based on the SCR of the leading audio pack A1 at time a1. As a result, the reproduction of the system stream 210 starts at time a1.

The present inventors have found that the time for starting the reproduction of the system stream varies in accordance with the type of reproduction apparatus. In the example shown in FIG. 2B, time a2 when the reproduction apparatus #1 starts the reproduction of the leading audio pack A1 in the system stream 210 corresponds to a time when the reproduction apparatus #2 starts the reproduction of the fifth audio pack A5 in the system stream 210.

Hereinafter, a data structure of a system stream and a method for reproducing the system stream according to the present invention will be described. A data structure of a system stream and a method for reproducing the system stream according to the present invention are suitable for reproducing high quality audio data.

Figure 3:
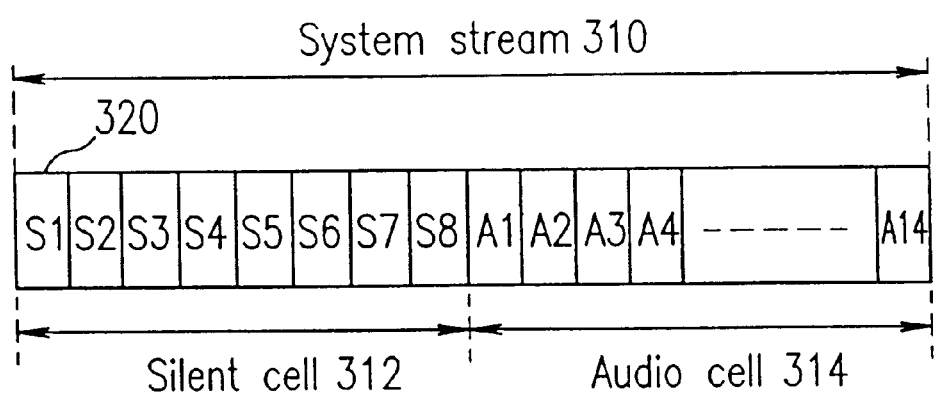
FIG. 3 shows a data structure of a system stream 310 stored on an optical disk in a first example according to the present invention.

FIG. 3 shows a data structure of a system stream 310 stored on an optical disk in a first example according to the present invention.

In the example shown in FIG. 3, the system stream 310 is formed of one audio elementary stream. The system stream 310 includes a silent cell 312 for defining a silent period and an audio cell 314 for defining the audio data to be reproduced after the silent period. The silent cell 312 and the audio cell 314 each include a plurality of audio packs 320.

The silent period is defined as a period to be silent, which is from when one system stream 310 to be reproduced among at least one system stream 310 is determined until the reproduction of an audio cell 314 included in the one system stream 310 is started. In the case where the optical disk includes information indicating the order of reproducing a plurality of system steams stored thereon, the silent period is defined as a period to be silent, which is from when the reproduction of one of the plurality of system streams is terminated until the reproduction of an audio cell included in the next system stream is started.

In the example shown in FIG. 3, the silent cell 312 includes audio packs S1 through S8, and the audio cell 314 includes audio packs A1 through A14. The data structure of the audio packs S1 through S8 and the data structure of the audio packs A1 through A14 are identical with the data structure of the audio pack 220 shown in FIG. 1. The silent cell 312 can include N-piece audio packs, and the audio cell 314 can include M-piece audio packs. N and M are each an arbitrary integer one or greater.

The audio data contained in the audio packs S1 through S8 and the audio data contained in the audio packs A1 through A14 are encoded in an identical encoding mode since the silent cell 312 and the audio cell 314 are included in one MPEG stream. The identical encoding mode refers to that all the encoding attributes such as encode format (e.g., LPCM, AC3) and sampling rate are identical.

The output level of the audio data contained in the audio packs S1 through S8 is substantially zero. In other words, audio data which substantially represents silence when being output is stored in the silent cell 312. It is not essential for defining the silent period that the output level of the audio data stored in the silent cell 312 is substantially zero. As described below, even when the audio data stored in the silent cell 312 is not substantially zero, silence can be realized during the silent period by controlling a muting circuit.

The PTS contained in each of the audio packs A1 through A14 of the audio cell 314 defines the timing for outputting the decoded audio packs from the decoder. Accordingly, the difference between the PTS contained in the leading audio pack A1 of the audio cell 314 and the PTS contained in the final audio pack A14 of the audio cell 314 nearly equals to a presentation period of the audio cell 314. Thus, the presentation period of the audio cell 314 is determined based on the difference between the first PTS and the final PTS in the audio cell 314.

The PTS contained in each of the audio packs S1 through S8 of the silent cell 312 defines the timing for outputting the decoded audio packs from the decoder. The PTS in each of the audio packs S1 through S8 does not define a presentation period of the silent cell 312 but defines the silent period before starting the reproduction of the system stream 310 including the silent cell 312. Accordingly, the difference between the PTS contained in the leading audio pack S1 of the silent cell 312 and the PTS contained in the first audio pack A1 of the audio cell 314 continued after the silent cell 312 equals to the silent period of the system stream 310. Thus, the silent period of the system stream 310 is determined based on the difference between the first PTS in the silent cell 312 and the first PTS in the audio cell 314 continued after the silent cell 312.

The silent period of the system stream 310 defined by the silent cell 312 is utilized by the reproduction apparatus as the period for absorbing a variation in the start-up period which depends on the type of reproduction apparatus. The length of the silent period is predetermined so as to include the start-up period. In a preferred embodiment of the invention, the length of the silent period is predetermined so as to include the longest start-up period of the start-up periods of the reproduction apparatuses which can be produced in conformity with the MPEG format.

When a reproduction apparatus is given, the start-up period of the reproduction apparatus is pre-calculated. For example, seek period $T_s$ is calculated from the seek distance. Time period $T_c$ and time period $T_m$ are fixed with respect to each reproduction apparatus. Accordingly, the start-up period of the reproduction apparatus is calculated as the sum of seek period $T_s$, time period $T_c$ and time period $T_m$.

Figure 4A:
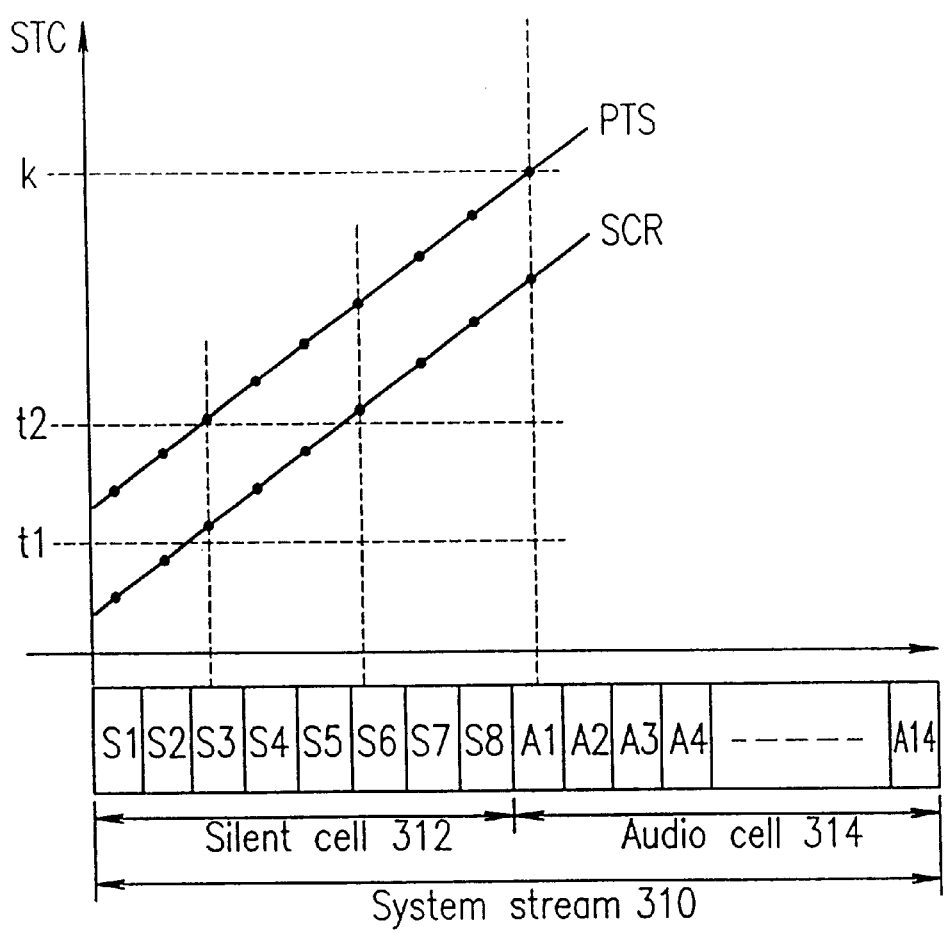
FIG. 4A shows the relationship between the audio packs S1 through S8 and A1 through A14, and the SCR and PTS included in each of the audio packs S1 through S8 and A1 through A14.

FIG. 4A shows the relationship between the system stream 310 including the plurality of audio packs S1 through S8 and A1 through A14, and the SCR and the PTS included in each of the plurality of audio packs S1 through S8 and A1 through A14.

When a reproduction apparatus reproduces the system stream 310 stored on the optical disk, the reproduction apparatus sets the SCR included in the leading audio pack S1 of the silent cell 312 as an initial value of an STC (system time clock), which is a reference clock. Then, the reproduction apparatus inputs the audio packs S2 through S8 and A1 through A14 following the audio pack S1 to a decoder at the timing indicated by the SCR with reference to the STC. The decoder decodes the input audio packs. The decoded audio packs are externally output from the decoder at the timing indicated by the PTS.

FIG. 4B shows the timing for starting the reproduction of the same system stream 310 in two reproduction apparatuses #1 and #2 of different types.

Reproduction apparatus #1 has a lower level of performance than that of reproduction apparatus #2. Reproduction of the system stream 310 by reproduction apparatus #1 requires a longer time period $T_s$ than reproduction of the system stream 310 by reproduction apparatus #2. In other words, time period $T_s$#1>time period $T_s$#2.

Reproduction apparatus #1 is controlled so that the reproduction of the system stream 310 starts at time t2 after time period $T_s$#1. As shown in FIG. 4A, the first audio pack among the audio packs having an SCR of a larger value than that of time t2 is audio pack S6. Accordingly, the STC is reset based on the SCR of the sixth audio pack S6 of the silent cell 312. As a result, the decoding of the audio data starts from some point in the silent cell 312, so that audio data is allowed to be output after time period $T_c$#1.

It should be noted that in reproduction apparatus #1, even though the audio data is decoded, the audio data is not output before time t3, since the muting circuit is in the mute state before time t3. Time period $T_m$#1 starts at time t3. During time period $T_m$#1, the muting circuit is controlled to be transitioned from the mute state to the non-mute state. At time k, when time period $T_m$#1 terminates, the muting circuit is in the non-mute state. Accordingly, the audio data of the audio packs A1 through A14 reproduced from time k is output.

Reproduction apparatus #2 is controlled so that the reproduction of the system stream 310 starts at time t1 after time period $T_s$#2. As shown in FIG. 4A, the first audio pack among the audio packs having an SCR of a larger value than that of time t1 is audio pack S3. Accordingly, the STC is reset based on the SCR of the third audio pack S3 of the silent cell 312. As a result, the decoding of the audio data starts from some point in the silent cell 312, so that audio data is allowed to be output after time period $T_c$#2.

It should be noted that in reproduction apparatus #2, even though the audio data is decoded, the audio data is not output before time t4, since the muting circuit is in the mute state before time t4. Time period $T_m$#2 starts at time t4. During time period $T_m$#2, the muting circuit is controlled to be transitioned from the mute state to the non-mute state. At time k, when time period $T_m$#2 terminates, the muting circuit is in the non-mute state. Accordingly, the audio data of the audio packs A1 through A14 reproduced from time k is output.

As described above, in reproduction apparatus #1, reproduction starts from the audio pack S6 of the silent cell 312; whereas in reproduction apparatus #2, reproduction starts from the audio pack S3 of the silent cell 312. In both of reproduction apparatuses #1 and #2, audio output is suppressed during the silent period. Thus, the silent period of the system stream 310 can always be the same regardless of the type of reproduction apparatus.

Even when the muting circuit malfunctions, audio output during the silent period can be prevented by setting the audio data contained in each of the audio packs S1 through S8 of the silent cell 312 to substantially zero. During the period in which the silent cell 312 is reproduced, the audio output can be suppressed regardless of the operating state of the muting circuit.

Figure 5:
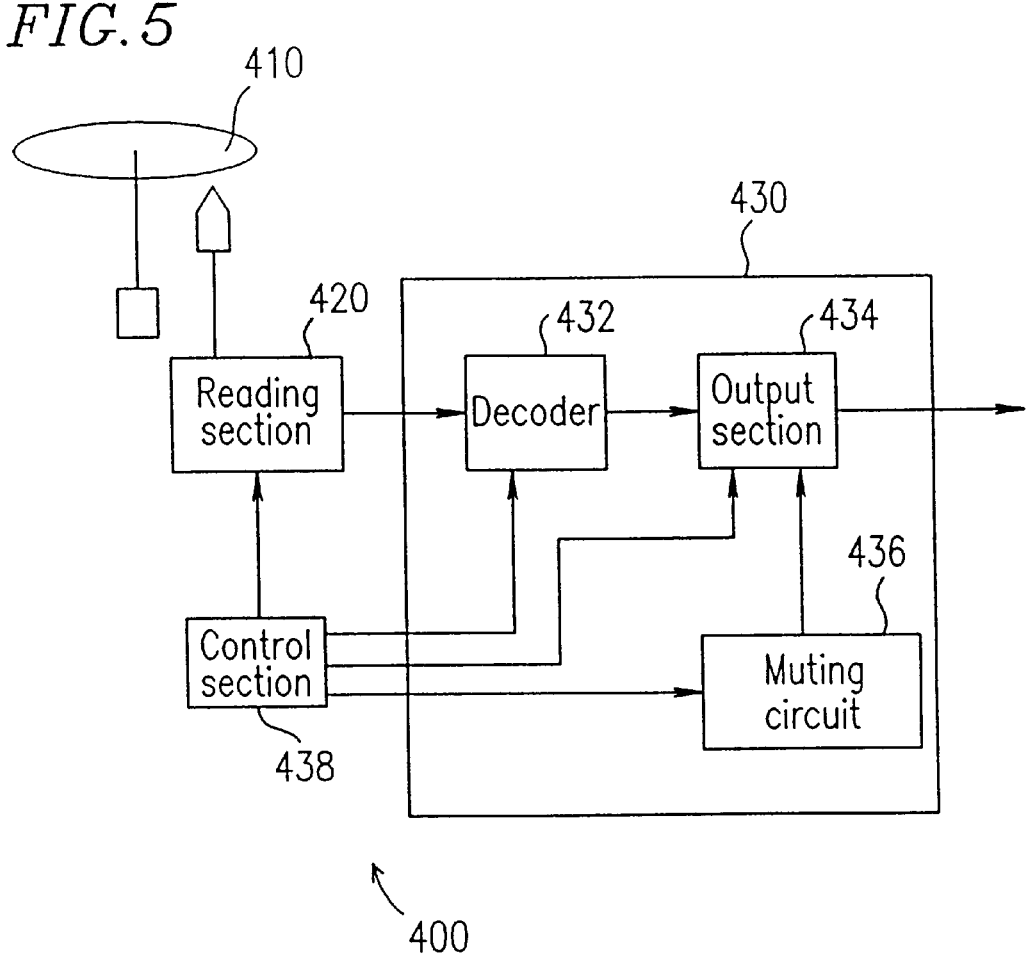
FIG. 5 shows a structure of a reproduction apparatus 400 in the first example according to the present invention.

FIG. 5 shows a structure of a reproduction apparatus 400 in the first example according to the present invention.

An optical disk 410 includes at least one system stream 310 (FIG. 3) stored thereon. The reproduction apparatus 400 reproduces at least one system stream 310 stored on the optical disk 410. The structure of the system stream 310 is as shown in FIG. 3.

As the optical disk 410, an arbitrary information storing medium can be used. For example, the optical disk 410 can be a DVD.

The reproduction apparatus 400 includes a reading section 420 for reading the system stream 310 to be reproduced among the at least one system stream 310, and a reproduction section 430 for reproducing a part of the silent cell 312 and the audio cell 314 from some point in the system stream 310 read by the reading section 420.

The reproduction section 430 includes a decoder 432 for decoding the system stream 310, an output section 434 for outputting the decoded system stream 310, and a muting circuit 436 for determining whether or not the output of the audio data needs to be muted.

The operation of the reading section 420 and the operation of the reproduction section 430 are controlled by a control section 438.

With reference to FIG. 5, the operation of the reproduction apparatus 400 will be described. Time period $T_s$ required for the reproduction apparatus 400 to seek to the position on the optical disk 410 at which the audio data is stored, time period $T_c$ from when the audio data is input to the decoder 432 until the decoded audio data is output from the decoder 432, and time period $T_m$ for transition of the muting circuit 436 from the mute state to the non-mute state are assumed to be pre-calculated. It is also assumed that the silent period is defined so as to include time period $T_s$, time period $T_c$ and time period $T_m$ by the silent cell 312 of the system stream 310 stored on the optical disk 410. Such assumptions are possible as described above.

The reading section 420 reads the system stream 310 to be reproduced among the at least one system stream 310 stored on the optical disk 410 in response to an instruction from the control section 438. The system stream 310 to be reproduced is selected by, for example, the user. Such selection is performed by, for example, selecting a desired item from the menu displayed on a TV (not shown) connected to the reproduction apparatus 400. Alternatively, the system stream 310 to be reproduced can be automatically determined by the reproduction apparatus 400. Such automatic determination is executed by a program executed by the control section 438 of the reproduction apparatus 400.

The control section 438 compares the SCR and seek period $T_s$ of each of the audio packs S1 through S8 included in the silent cell 312 of the system stream 310 read by the reading section 420, thereby determining the first audio pack among the audio packs having an SCR of a larger value than a value indicating the termination time of seek period $T_s$ (e.g., audio pack A6). The control section 438 resets the STC based on the SCR of the audio pack A6. As a result, the audio stream 310 is input to the decoder 432 from the audio pack A6 located at some point in the silent cell 312.

The decoder 432 decodes the input audio packs. The audio packs decoded by the decoder 432 are output from the decoder 432 in accordance with the output timing defined by the PTS of each of the audio packs. The time when the decoded audio pack is output generally is the time when time period $T_c$ has been passed after time period $T_s$ is terminated.

The output section 434 outputs the audio data included in the decoded audio packs.

The muting circuit 436 determines whether or not the audio data output from the outputs section 434 needs to be muted. The control section 438 controls the muting circuit 436 to mute the audio data output from the output section 434 until the start of time period $T_m$ and controls the muting circuit 436 to be transitioned from the mute state to the non-mute state during time period $T_m$.

Thus, audio output is suppressed during the silent period of the system stream 310.

The silent period defined by the silent cell 312 is defined so as to absorb the start-up period which is inherent to reproduction apparatuses. Accordingly, even when the system stream 310 is reproduced by a reproduction apparatus other than the reproduction apparatus 400, audio output is suppressed during the silent period of the system stream 310.

EXAMPLE 2

A multimedia information storing medium in a second example according to the present invention will be described.

(1) Physical Structure of the Optical Disk

Figure 6A:
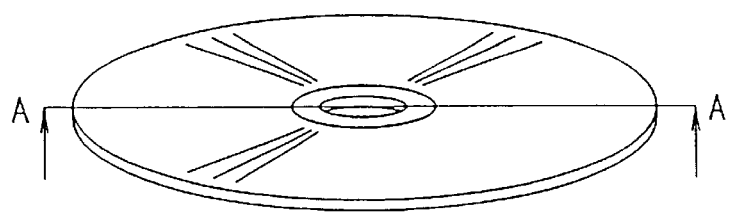
FIG. 6A shows an external appearance of an optical disk in a second example according to the present invention.
Figure 6B:
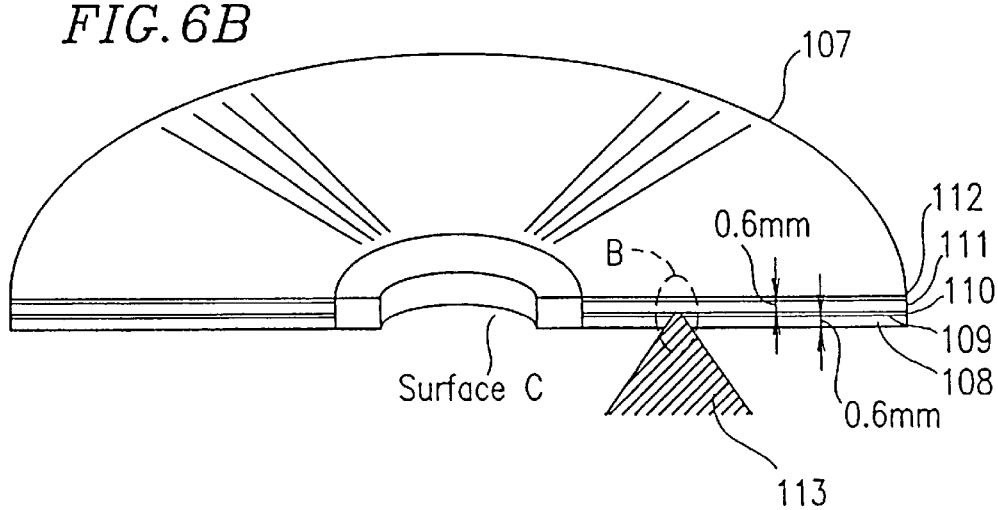
FIG. 6B shows a cross section of the optical disk in the second example according to the present invention.
Figure 6C:
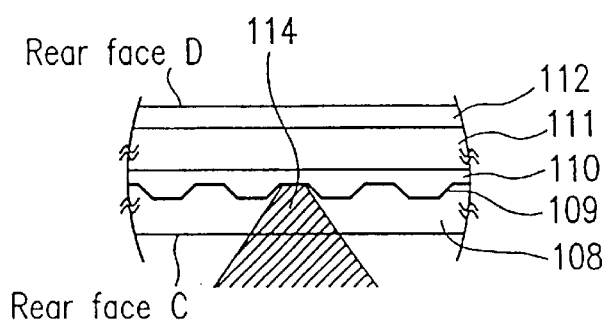
FIG. 6C is an enlarged cross-sectional view of the optical disk in the second example according to the present invention.

FIG. 6A shows an external appearance of a DVD 107, which is a multimedia optical disk. FIG. 6B shows a cross-section of the DVD 107 taken along line A-A' in FIG. 6A. FIG. 6C is an enlarged cross-sectional view of portion B shown in FIG. 6B.

As shown in FIG. 6B, the DVD 107 is formed by sequentially laminating a first transparent substrate 108, an information layer 109, an adhesive layer 110, a second transparent substrate 111, and a print layer 112 on which a label is to be printed in this order.

The first transparent substrate 108 and the second transparent substrate 111 are reinforcement substrates formed of the same material. In the example shown in FIG. 6B, these substrates each have a thickness of about 0.6 mm. These substrates can each have a thickness in the range between about 0.5 mm and about 0.7 mm.

The adhesive layer 110 is provided between the information layer 109 and the second transparent substrate 111 in order to adhere the information layer 109 to the second transparent substrate 111.

On the face of the information layer 109 in contact with the first transparent substrate 108 is formed a reflective film (not shown) formed of a thin metal film or the like. By using a molding technique, a high density of convex and concave pits are formed in the reflective film.

Figure 6D:
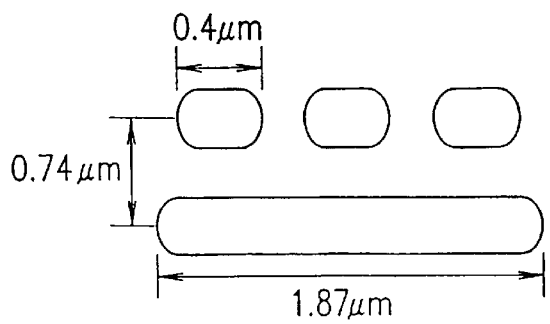
FIG. 6D shows pits formed in the optical disk in the second example according to the present invention.

FIG. 6D shows the shapes of pits formed in the reflective film. In the example shown in FIG. 6D, each pit has a length of 0.4 µm to 2.054 µm. A spiral track is formed in the DVD 107. The pits are formed alongside the spiral track so as to be at a distance of 0.74 µm from the spiral track in a radial direction of the DVD 107. Thus, an array of pits are formed along the spiral track.

When a light beam 113 is radiated toward the DVD 107, a light spot 114 is formed on the information layer 109 as shown in FIG. 6C. The information stored on the DVD 107 is detected as variation in the reflectance of the portion of the information layer 119 which is illuminated by the light spot 114.

The diameter of the light spot 114 of the DVD 107 is about 1/1.6 times the diameter of a light spot on a CD and because the numerical aperture (NA) of an object lens for DVDs is larger than the numerical aperture of an object lens for compact disks and because the wavelength λ of a light beam for DVDs is shorter than the wavelength λ of a light beam for CDs.

A DVD having the above-described physical structure can store about 4.7 Gbytes of information on one side. A storing capacity of about 4.7 Gbytes is nearly 8 times the storing capacity of a conventional CD. Such a large storing capacity of DVDs can greatly improve the quality of moving pictures and also greatly extend the reproducible time period of moving pictures. Whereas the reproducible time period of a conventional video CD is 74 minutes, a DVD boasts of a reproducible time period of 2 hours or more.

The fundamental technology which realizes such a large storing capacity lies in reduction of the spot diameter D of a light beam. The spot diameter D is calculated from the formula: spot diameter D=laser wavelength λ/numerical aperture NA of the object lens. Accordingly, the spot diameter D can be minimized by decreasing the laser wavelength λ and increasing the numerical aperture NA of the object lens. It should be noted, however, that increasing the numerical aperture NA of the object lens can result in coma aberration due to the relative slant of the optical axis of the light beam with respect to the face of the disk (i.e., "tilt"). In the case of DVDs, the coma aberration is minimized by reducing the thickness of a transparent substrate. However, reducing the thickness of a transparent substrate can result in another problem of lower mechanical strength of the disk. In the case of DVDs, the strength of the transparent substrate is reinforced by attaching another substrate to the transparent substrate, thereby overcoming the problems associated with the mechanical strength of the disk.

A red semiconductor laser having a short wavelength of 650 nm and an object lens having a large numerical aperture (NA) of about 0.6 mm are used to read the information stored on a DVD. By employing a thin transparent substrate having a thickness of about 0.6 mm in addition to the above-mentioned laser and object lens, it is possible to store about 4.7 Gbytes of information on one side of an optical disk having a diameter of 120 mm.

Figure 7A:
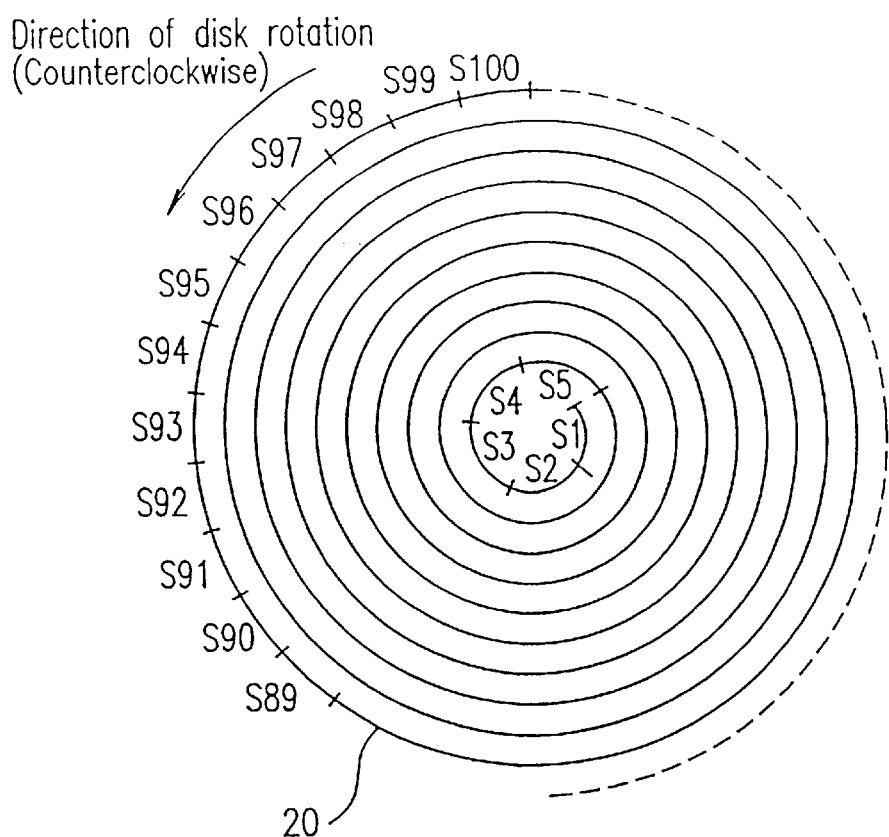
FIG. 7A shows a track structure of the optical disk shown in FIG. 6A.

FIG. 7A schematically illustrates a spiral track 20 formed from the inner periphery toward the outer periphery of the information layer 109 of the DVD 107. The spiral track 20 is divided into prescribed units referred to as sectors. In FIG. 7A, the respective sectors are represented by denotations S1, S2, . . . , S99, and S100. The information stored on the DVD 100 is read on a sector-by-sector basis.

Figure 7B:
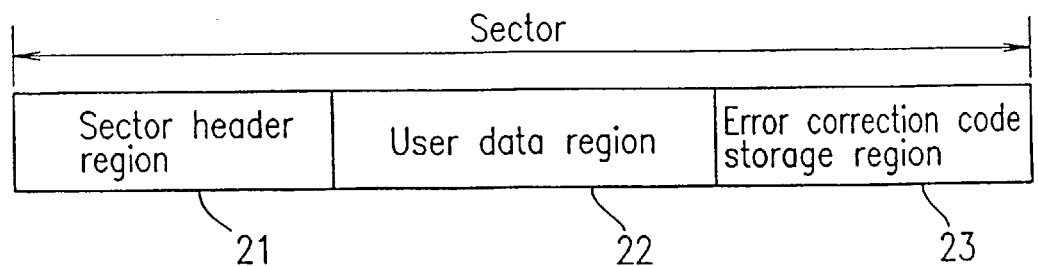
FIG. 7B shows a sector structure of the optical disk shown in FIG. 6A.

FIG. 7B shows an internal structure of a sector, where the sector includes a sector header region 21, a user data region 22, and an error correction code storage region 23.

The sector header region 21 stores a sector address for identifying the sector and an error detection code thereof. Based on these sector addresses, a disk reproduction apparatus determines one of a plurality of sectors from which information should be read.

The user data region 22 stores a 2 Kbyte long data string.

The error correction code storage region 23 stores error correction codes for the sector header region 21 and the user data region 22 included in the same sector. A disk reproduction apparatus performs error detection by using the error correction codes and performs error correction based on the error detection results, thereby securing reliability of data reading.

(2) Logical Structure of the Optical Disk

Figure 8:
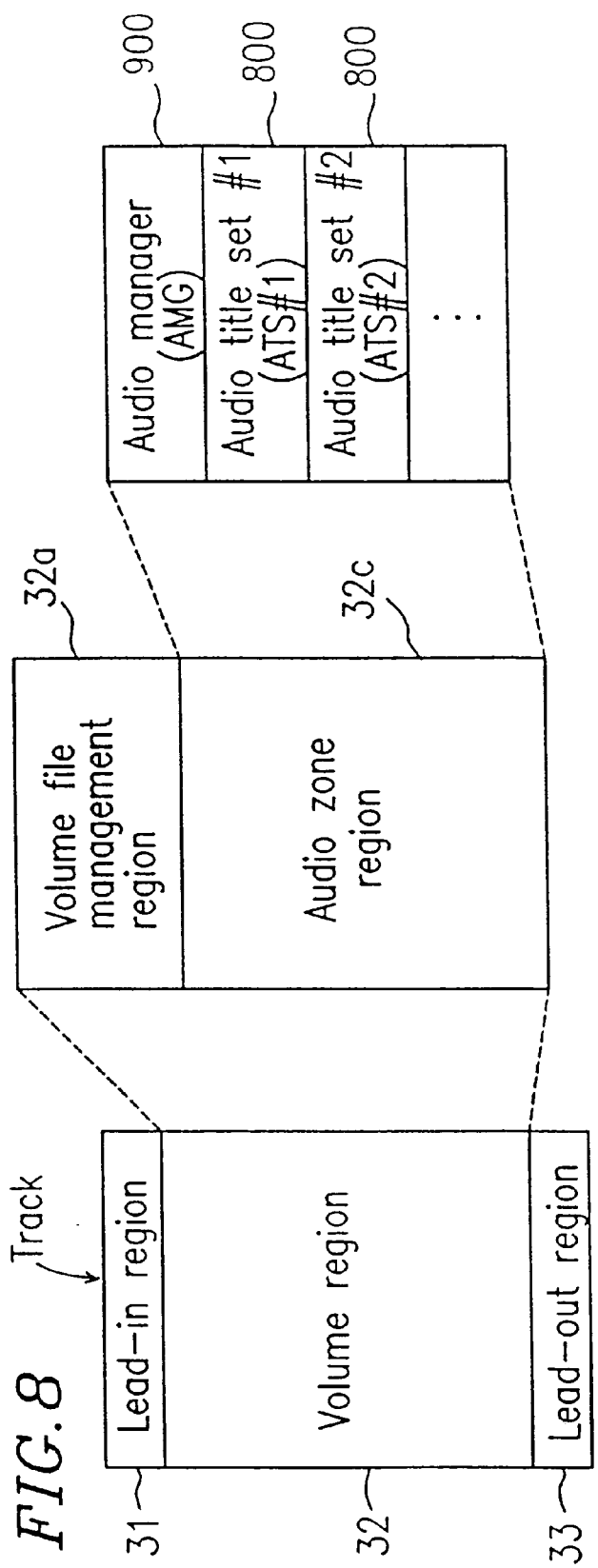
FIG. 8 shows a logical structure of the optical disk shown in FIG. 6A.

FIG. 8 shows a logical structure of the DVD 107. As shown in FIG. 8, the region of the DVD 107 is divided into a lead-in region 31, a volume region 32, and a lead-out region 33. These regions can be identified by identification information included in sector addresses of physical sectors. The physical sectors are arrayed in an ascending order based on their sector addresses.

In the lead-in region 31, data for stabilizing the operation of a reproduction apparatus at the beginning of read, for example, is stored.

No meaningful data is stored in the lead-out region 33. The lead-out region 33 is used for informing the disk reproduction apparatus of the termination of reproduction.

The volume region 32 stores digital data corresponding to an application. The physical sectors included in the volume region 32 are managed as logical blocks. The logical blocks are identified by the sequential numbers (logical block numbers) respectively assigned to the physical sectors after the first physical sector (designated as the 0th physical sector) in the volume region 32.

As shown in FIG. 8, the volume region 32 is subdivided into a volume file management region 32a and an audio zone region 32c.

The volume file management region 32a stores file system management information for managing a plurality of logical blocks as files in accordance with ISO13346. The file system management information is information indicating the correspondence between the name of each of a plurality of files and the addresses of the logical blocks occupied by that file. A disk reproduction apparatus achieves file-by-file access to the optical disk based on the file system management information. Specifically, the disk reproduction apparatus refers to the file system management information to obtain the addresses of the logical blocks corresponding to a given file name, and accesses the logical blocks based on these addresses. As a result, the digital data contained in a desired file can be read.

The audio zone region 32c stores audio manager 900 and one or more audio title sets 800.

The audio title set 800 contains a plurality of pieces of audio data and management information for managing the order of reproducing the plurality of pieces of audio data. The audio title set 800 has a data structure which allows for management of the audio data in units which are referred to as audio titles. Typically, an audio title corresponds to a music album containing one or more tunes.

(3) Data Structure of the Audio Zone Region 32c

The audio zone region 32c stores audio manager 900 and one or more audio title sets 800.

(3.1) Data Structure of the Audio Title Set 800

Figure 10:
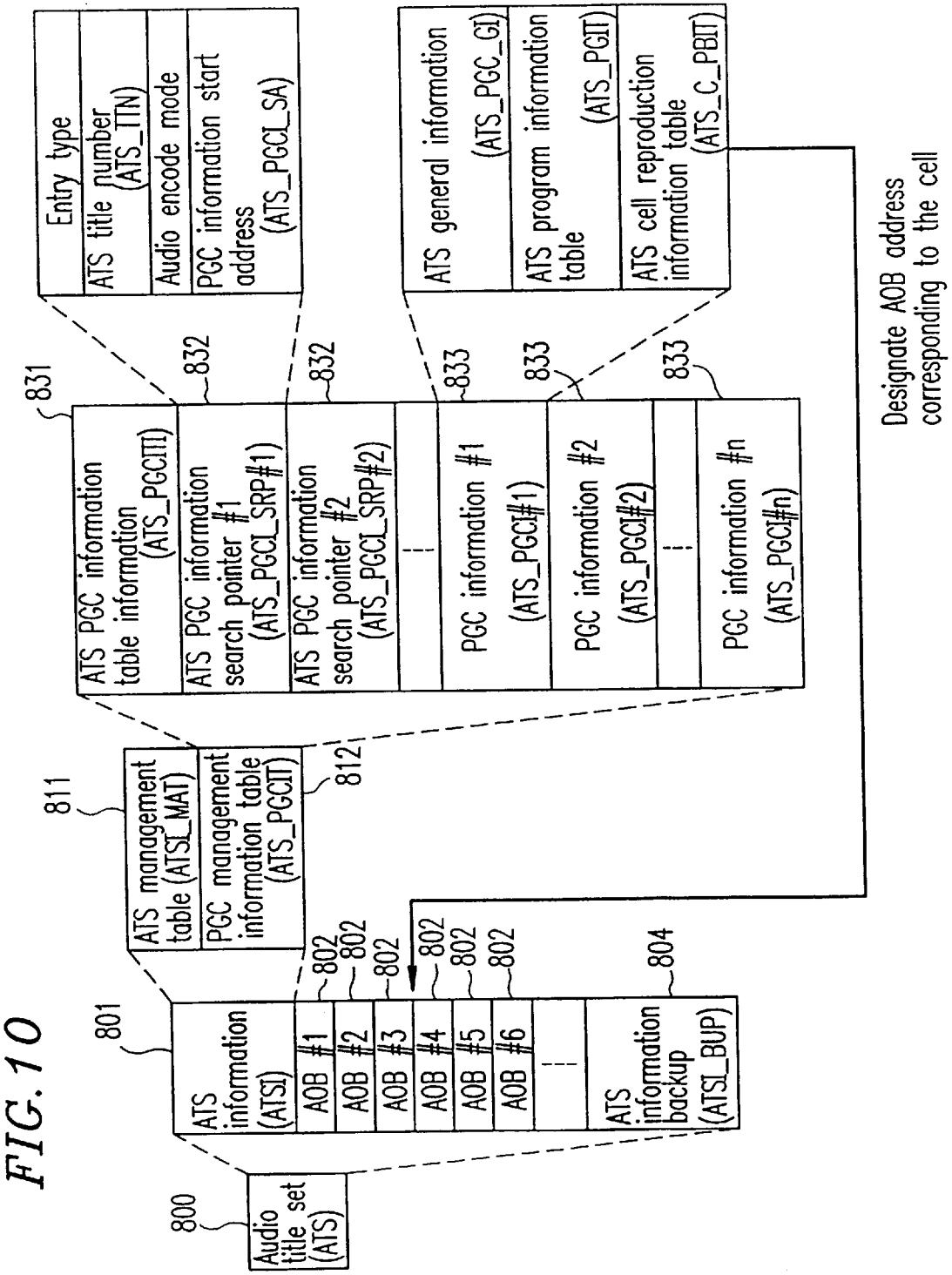
FIG. 10 shows a data structure of an audio title set.

FIG. 10 shows a data structure of the audio title set 800. The audio title set 800 includes a plurality of audio objects (hereinafter, referred to as "AOBs") 802, audio title set information (ATSI) 801 for managing the order of reproducing the plurality of AOBs 802, and audio title set information backup (ATSI_BUP) 804 which is backup data of the audio title set information 801. In the following description, an "audio title set" will occasionally be referred to as an "ATS".

(3.1.1) Data Structure of the AOB 802

The AOB 802 is packetized into 2 Kbytes. The AOB 802 stores data in the LPCM format, AC3 format, MPEG Audio format (see ISO/IEC DIS 13818-3: July, 1996), DTS format (see DTS Coherent Acoustics "Delivering high quality multichannel sound to the consumer" presented at the 100th Convention, May 11–14, 1996 Copenhagen AES) or SDDS format (see SDDS Specification for Disc (Version 1.0)-Digital audio multi-channel coding, Sony Corporation). In the case of the LPCM format, the sample bit is 16, 20, or 24 bits, with a sampling frequency of 48 kHz, 96 kHz, 192 kHz, 44.1 kHz, 88.2 kHz, or 176.4 kHz.

(3.1.2) Data Structure of the Audio Title Set Information 801

The audio title set information (ATSI) 801 includes information for managing the order of reproducing the AOBs 802. The order of reproducing the AOBs 802 is designated by a program chain (PGC), as in the case of video objects (VOBs). Different PGCs can define different orders of reproduction of AOBs.

As shown in FIG. 10, the audio title set information (ATSI) 801 includes an ATS management table (ATSI_MAT) 811 and a PGC management information table (ATS_PGCIT) 812.

The ATS management table 811 serves as header information of the audio title set information 801. The ATS management table 811 includes a pointer indicating a region in which the AOB 802 is stored, a pointer indicating a region in which the PGC management information table 812 is stored, and attribute information on the AOB 802. In the case where a still picture is stored on the DVD 107, the ATS management table 811 also includes attribute information and the like of the still picture.

The PGC management information table (ATS_PGCIT) 812 includes ATS PGC information table information (ATS_PGCITI) 831, a plurality of ATS PGC information search pointers (ATS_PGCI_SRPs) 832, and a plurality of PGC information (ATS_PGCI) units 833.

The ATS PGC information search pointers (ATS_PGCI_SRPs) 832 are indices for a plurality of PGCs stored in the PGC management information table 812 and designate the PGC information to be executed first on a title-by-title basis.

Each of the PGC information units describes positions on the optical disk 107 where one or more audio objects and the order of reproduction thereof. Reproduction of the same audio object can be described by different PGC information. Specifically, the PGC information includes "ATS PGC general information (ATS_PGC_GI)", "ATS program information table (ATS_PGIT)", and "ATS cell reproduction information table (ATS_C_PBIT)".

Figure 12:
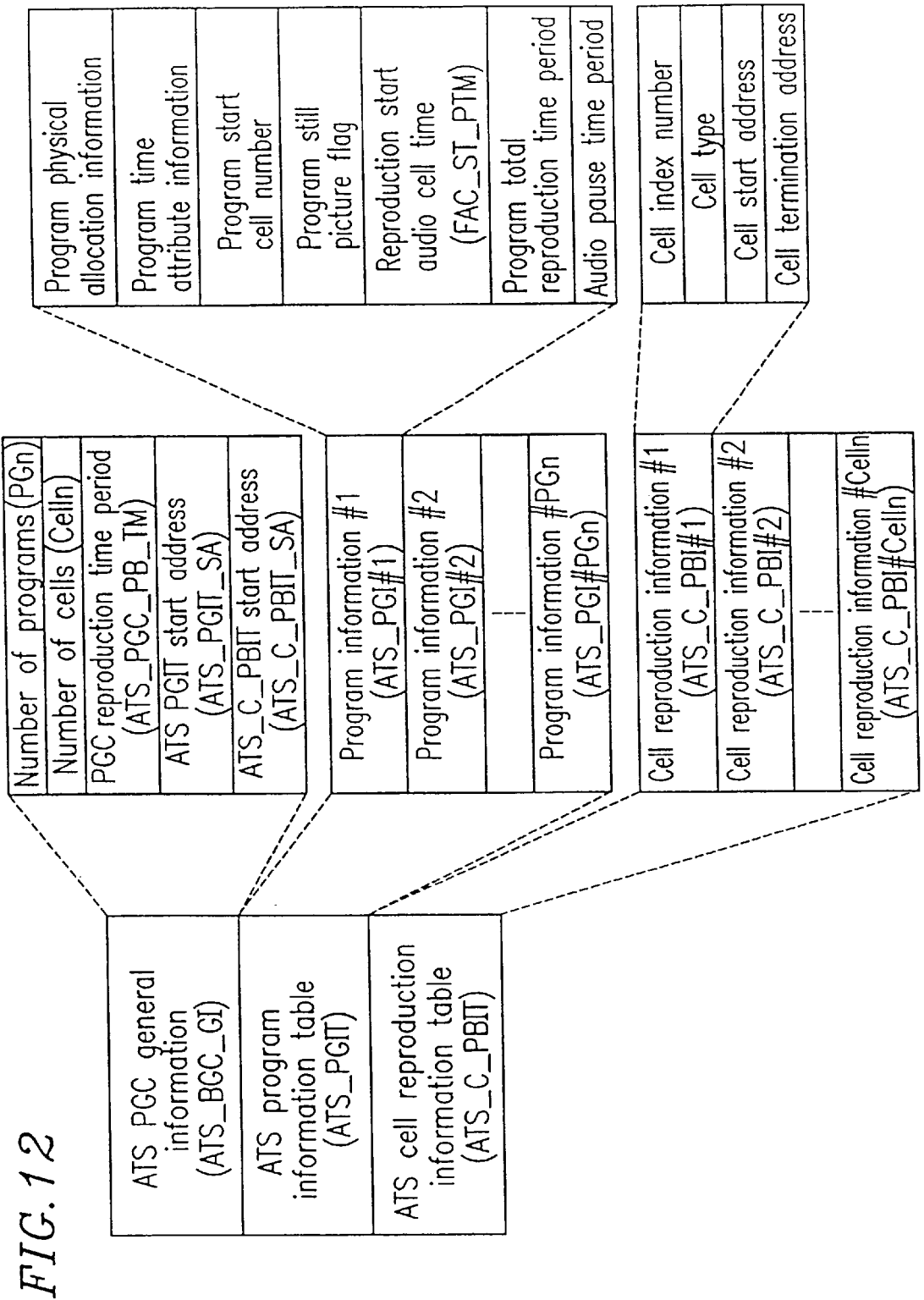
FIG. 12 shows a data structure of PGC information and cell information.

FIG. 12 shows a data structure of the PGC information. As shown in FIG. 12, "ATS PGC general information (ATS_PGC_GI)" includes the number of programs and the number of cells included in the PGC information, the reproduction time period of the PGC, and information on pointers to the "ATS program information table (ATS_PGIT)" and to "ATS cell reproduction information table (ATS_C_PBIT)".

The "ATS program information table (ATS_PGIT)" includes "program physical allocation information" indicating whether or not the AOB of each program and the AOB of the previous program are recorded at physically discontinuous positions on the optical disk, "program time attribute information" indicating whether or not the time information of the AOB is continuous with the time information of the previous AOB, "program start cell number" indicating the first cell number forming the program, "program still picture flag" indicating whether or not the program includes a still picture, "reproduction start audio cell time" indicating the first time information of the first audio cell included in the program, "program total reproduction time period" indicating the reproduction time period of the program, and "audio pause time period" indicating the silent period until the reproduction of the audio cell of the program starts.

The "ATS cell reproduction information table (ATS_C_PBIT)" stores cell information forming the AOB to be reproduced. Specifically, the AOB includes "cell index number" indicating the order of cells included in the program, "cell type" indicating the attribute of the cell (i.e., whether the cell is a still picture cell, a silent cell or an audio cell), "cell start address" indicating the start address of the cell in the form of a relative address with respect to the first pack of the AOB of the ATS including the cell, and "cell termination address" indicating the final address of the cell in the same manner.

Figure 11:
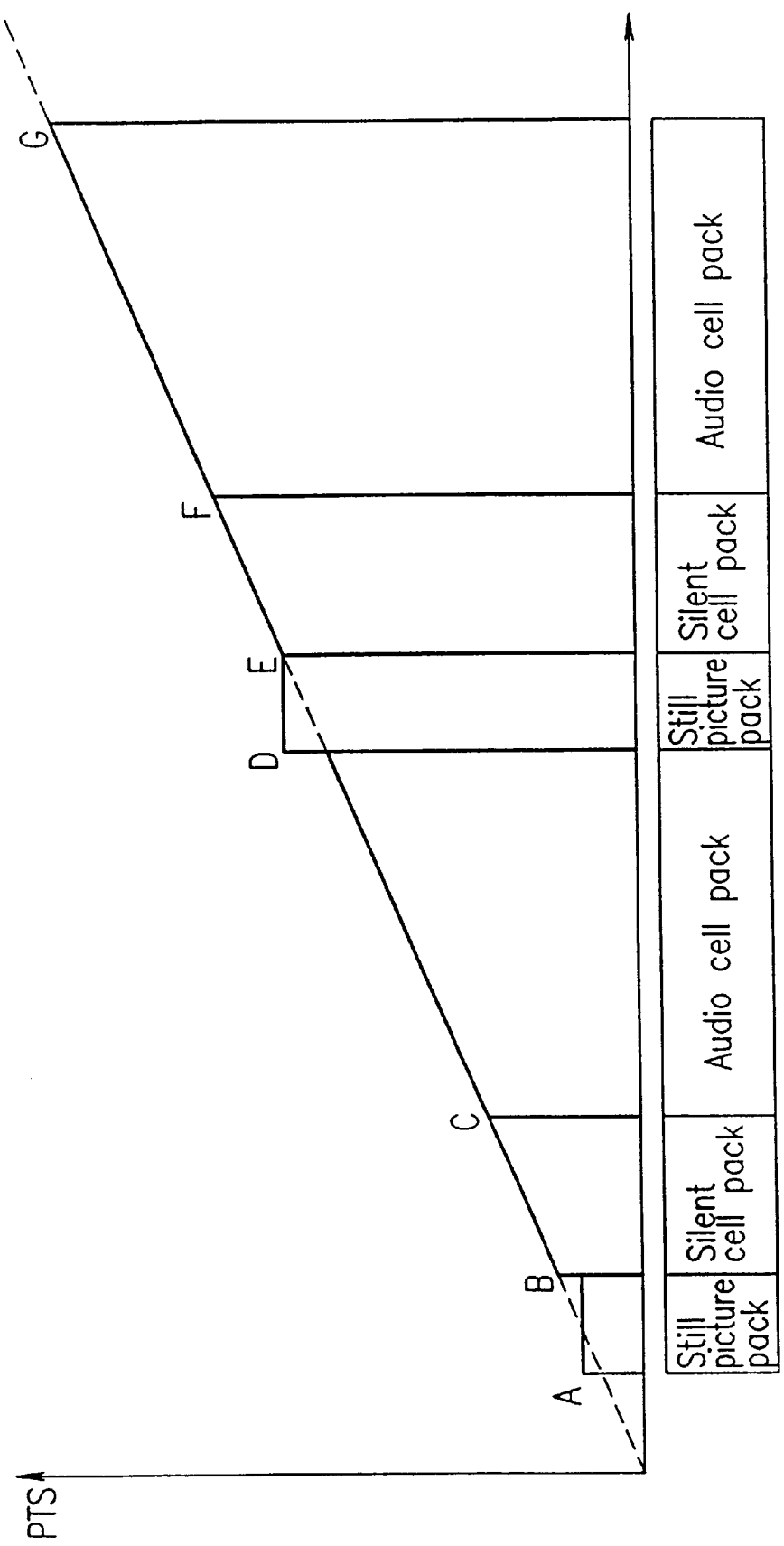
FIG. 11 shows an exemplary structure of an audio object (AOB)

FIG. 11 shows an exemplary structure of the AOB. The AOB is a part of an MPEG2 stream and includes a still picture cell including a still picture pack, a silent cell including an audio pack including substantially silent audio data, and an audio cell including an audio pack of audio data forming a tune. The AOB includes one or more audio cells and may not include a still picture cell or a silent cell. Still picture cells are never continuous with each other and silent cells are never continuous with each other. A still picture cell is always followed by a silent cell or an audio cell. A silent cell is always followed by an audio cell. In the example shown in FIG. 11, audio cells and silent cells exist and are physically continuous. Time information is also continuous; i.e., the "program physical allocation information" has a value representing "continue", and the "program time attribute information" also has a value representing "continue".

In FIG. 11, the line passing through points A through G represents a change in the value of the time information (i.e., PTS) of AOB. Point A represents a value of the PTS of the still picture cell. Point B represents a value of the first PTS of a silent cell. Point C represents a value of the first PTS of an audio cell. Thus, the PTS of a silent cell is continuous to the PTS of an audio cell, and there is no data underflow gap, as referred to with respect to the MPEG2 stream, between the silent cell and the audio cell. Point B, at which the value of the PTS of the silent cell is larger than the value of the PTS of the still picture cell, represents that a still picture in the still picture cell is displayed before the reproduction of the silent cell starts. The PTS of the next still picture cell is represented by point D, and the PTS of the next silent cell is represented by point E. In the case where the PTS of the still picture cell and the PTS of the silent cell have an equal value, the reproduction of the silent cell starts simultaneously when the still picture is displayed. The difference between the first PTS of the next audio cell at point F and the final PTS of the audio cell at point D is an "audio pause time period". Since the gap between the PTS's needs to be 0.7 seconds or less as specified by MPEG2, the difference at point B between the first PTS of the silent cell and the PTS of the still picture cell, and the difference at point D between the first PTS of the still picture cell and the final PTS of the audio cell need to fulfill such a condition.

Figure 14:
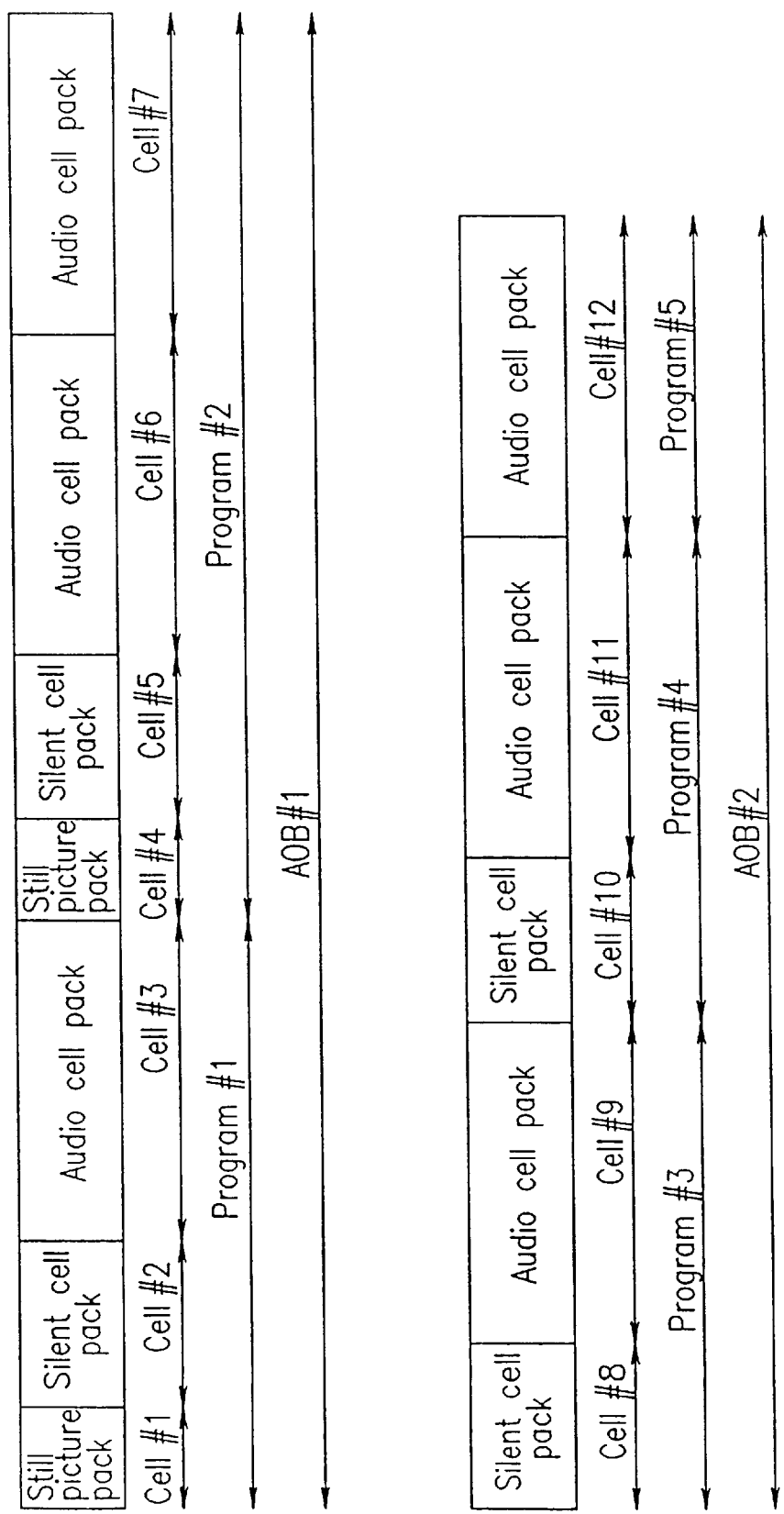
FIG. 14 shows an example of PGC forming a title.

FIG. 14 shows an exemplary PGC forming a title. The example shown in FIG. 14 includes five programs. Programs #1 and #2 correspond to AOB #1, and programs #3, #4 and #5 correspond to AOB #2. On the information storing medium, AOB #1 is recorded after AOB #2. Programs #1 and #2 both include a still picture cell and a silent cell, and program #2 includes two audio cells. Programs #3 and #4 includes only a silent cell, and program #5 includes only an audio cell.

In the case where all the audio cells each have a reproduction time period of 60 seconds (5,400,000 in PTS), all the silent cells each have a reproduction time period of 1 second (90,000 in PTS), and the PTS of the silent cell has the same value as that of the first PTS of the silent cell, program information can be described as shown in FIG. 15. Under the conditions that the size of the still picture data is about 1.88 Mbits and the audio data is 48 kHz, 16 bit sampling with 2 channels, the number of the still picture packs is 112, the number of the silent cell packs is 96, and the number of the audio cell packs is 5760 as shown in FIG. 16.

The audio title set has been described. Next, with reference to FIG. 9, the audio manager will be described.

(3.2) Data Structure of the Audio Manager 900

The audio manager 900 is information for controlling the reproduction which is to be first referred to for performing audio-oriented reproduction of the information on the optical disk by a reproduction apparatus.

Figure 9:
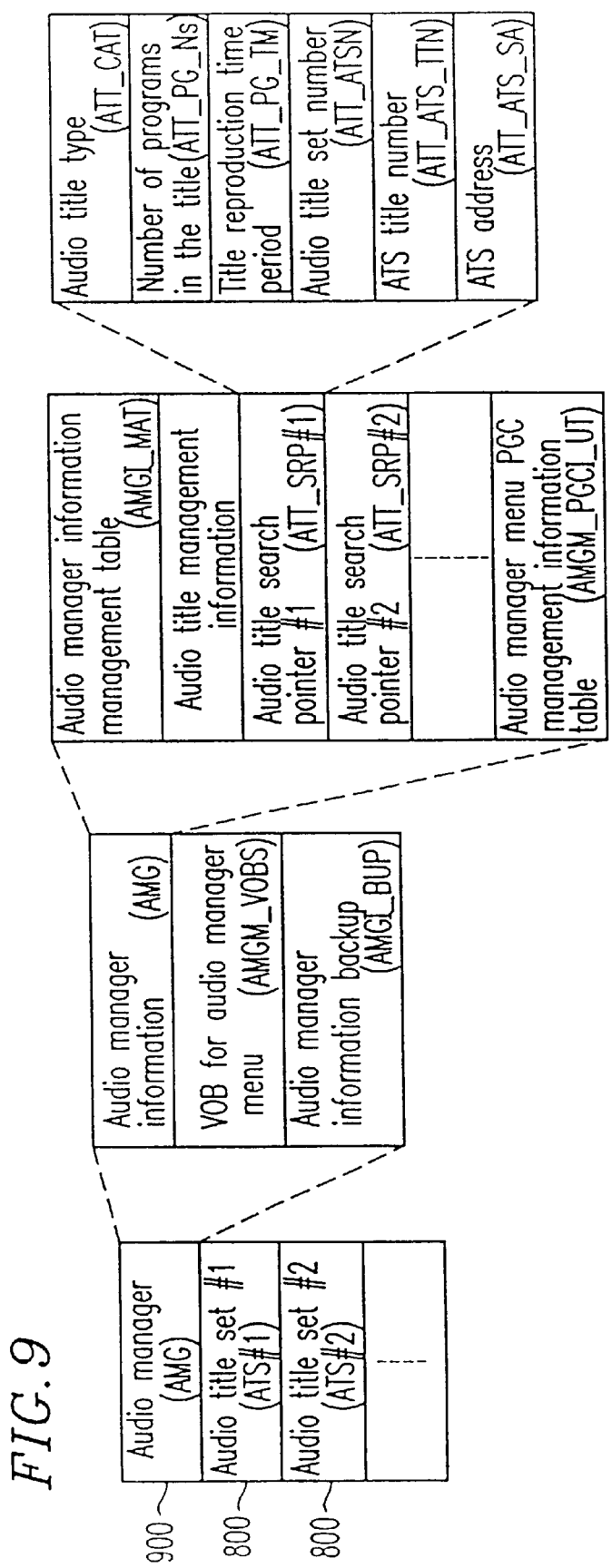
FIG. 9 shows a data structure of an audio manager.

FIG. 9 shows a data structure of the audio manager 900.

The audio manager 900 includes "audio manager information (AMGI)", "VOB for audio manager menu (AMGM_VOBS)", and "audio manager information backup (AMGI_BUP)".

The "audio manager information (AMGI)" includes "audio manager information management table (AMGI_MAT)" including attribute information and pointer information, "audio title management information" indicating the number of audio titles and the like, "audio title search pointer (ATT_SRP)" indicating search information on the audio titles, and "audio manager menu PGC management information table (AMGM_PGCI_UT)" indicating PGC information for audio manager menu.

The "audio title search pointer (ATT_SRP)" includes "audio title type" indicating the type of each title, "number of programs in the titles" indicating the number of programs included in the titles, "title reproduction time period" indicating the reproduction time period of the titles, "ATS title number" indicating the set number of the ATS to which each title belongs, "ATS title number" indicating the title number of each title in the ATS, and "ATS address" indicating the address of the ATS to which each title belongs.

The audio zone region and the DVD as a multimedia optical disk have been described. Next, a reproduction apparatus according to the present invention will be described.

Figure 24:
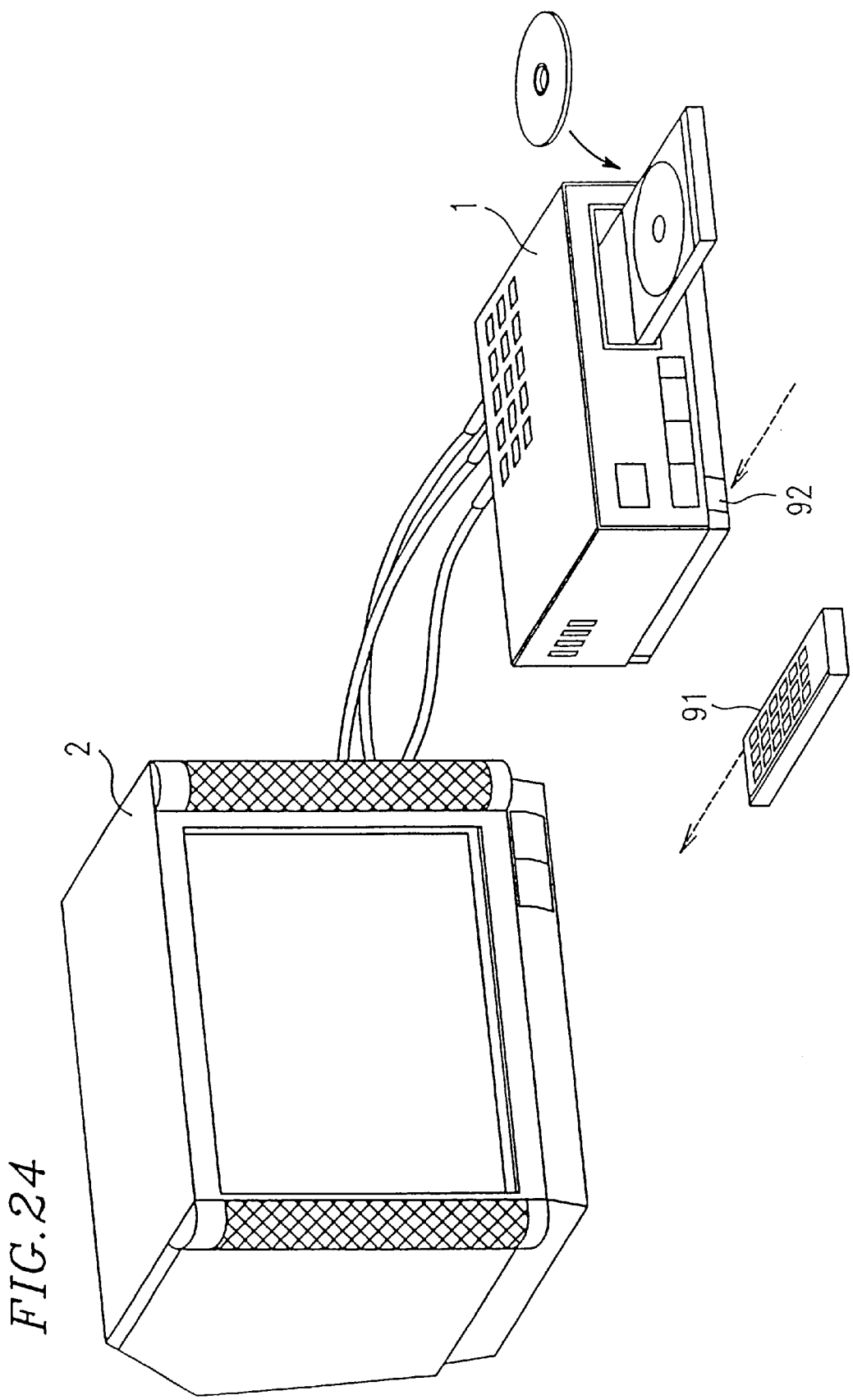
FIG. 24 is a DVD player and peripheral devices connected thereto.

First, an external appearance of a DVD player, which is a reproduction apparatus for multimedia optical disks will be described. FIG. 24 shows external appearances of a DVD player 1, a TV monitor 2 and a remote controller 91.

The DVD player 1 has an opening in a front face of a chassis thereof, and includes a driving mechanism for setting an optical disk in the depth direction of the opening.

Provided on the front face of the DVD player 1 is a remote control receiving section 92 having a light receiving element for receiving infrared rays emitted by the remote controller 91. When an operator operates a remote controller held in his/her hand, the remote control receiving section 92 sends an interrupt signal indicating that a key signal has been received.

Provided on a rear face of the DVD player 1 are video and audio output terminals. A video signal reproduced from the DVD can be output to the large TV monitor 2 for home use by connecting an AV cord to the video and audio output terminals. Thus, the operator can enjoy the video reproduced from the DVD on a large TV of, for example, 33 inches or 35 inches. As can be appreciated from the above description, the DVD player 1 in this example is not used in the state of being connected to a personal computer but is used with the TV monitor 2 as an electronic appliance for home use.

Figure 25:
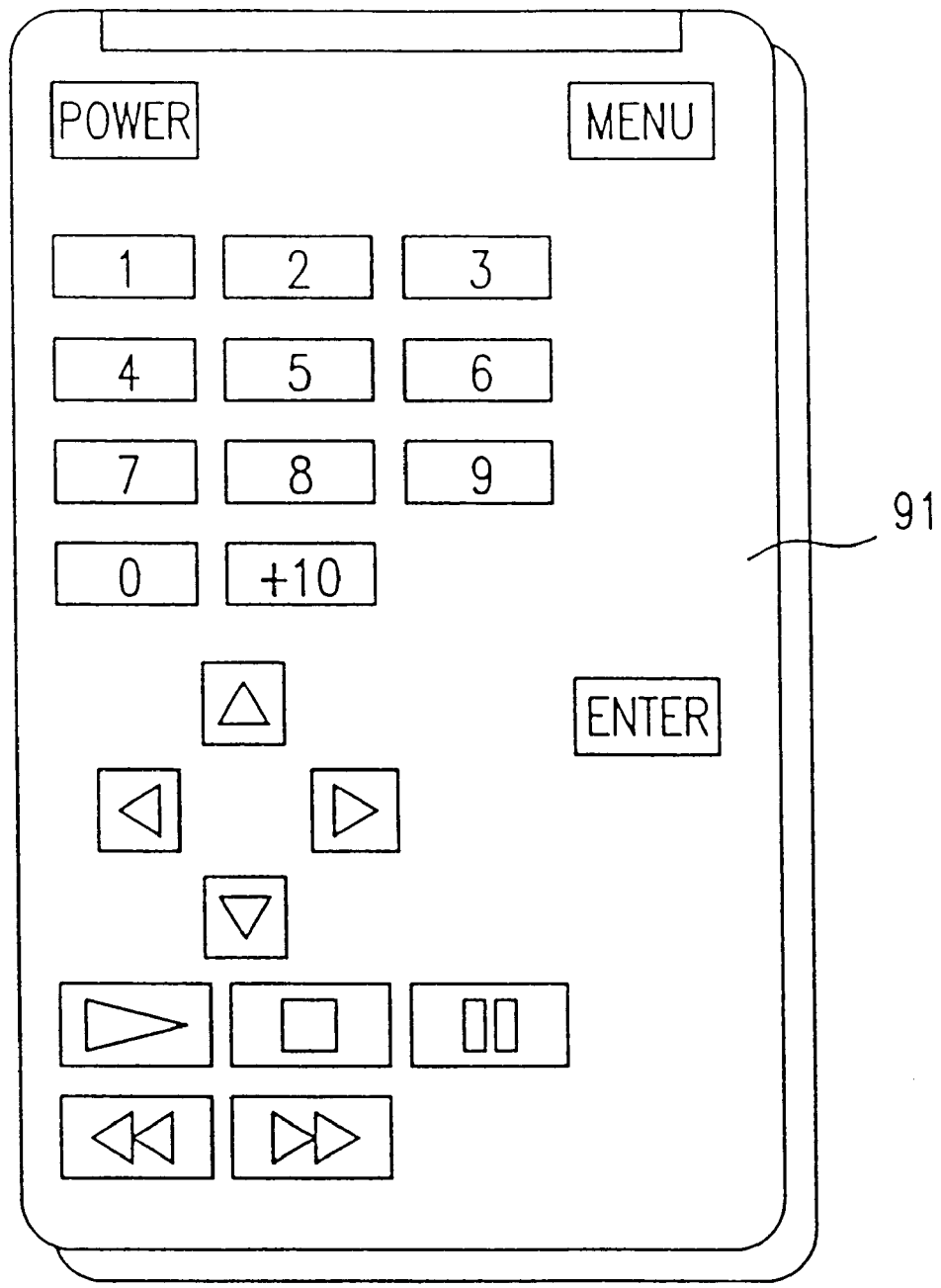
FIG. 25 shows a remote controller used for operating the DVD player.

The remote controller 91 includes a spring-loaded keypad on a surface of a casing thereof, and outputs a code corresponding to a pressed key by infrared rays. FIG. 25 shows an operation panel of the remote controller 91. The "POWER" key on the operation panel is for turning ON or OFF the DVD player 1. The "MENU" key is used for retrieving the volume menu of the optical disk during reproduction of the program chain. Ten keys are used for, for example, chapter-jumping the movie or selecting music tunes. Upward, downward, leftward and rightward cursor keys are used for selecting items. The "ENTER" key is used for confirming the item selected by the cursor. When the cursor is moved on the items by the upward, downward, leftward and rightward cursor keys, the item on which the cursor is positioned is displayed with a select color of item color information of the management information pack. When the item is confirmed by the "ENTER" key, the item is displayed with a confirmation color. In addition, there are keys which are common with other AV apparatuses such as, for example, "PLAY", "STOP", "PAUSE", "FORWARD" and "REWIND" keys.

Next, the structure of the DVD player, which is a reproduction apparatus for multimedia optical disks will be described.

Figure 13:
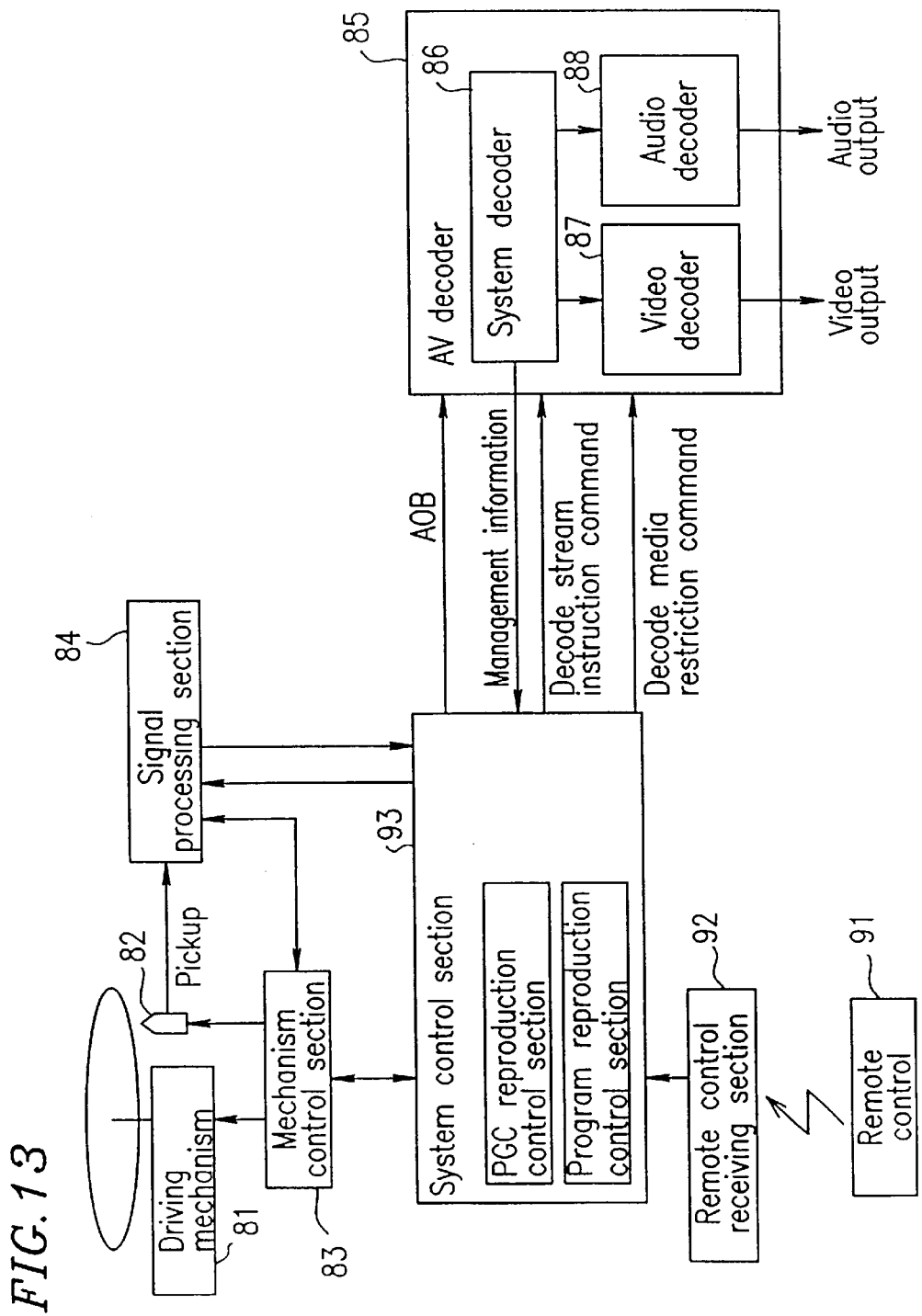
FIG. 13 is a block diagram showing an internal structure of a DVD player, which is a reproduction apparatus.

FIG. 13 is a block diagram of an internal structure of the DVD player. The DVD player includes a driving mechanism 81, an optical pickup 82, a mechanism control section 83, a signal processing section 84, an AV decoder 85, a remote control receiving section 92 and a system control section 93.

The driving mechanism 81 includes a table on which an optical disk is set and a spindle motor for rotating the optical disk which is set on the table. The table is structured to move to be in and out of the chassis by an eject mechanism not shown. When the table is out of the chassis, the operator sets an optical disk onto the table. When the optical disk is set on the table and the table is moved back to the chassis, the optical disk is loaded on the DVD player.

The mechanism control section 83 controls a mechanical system including the motor 81 for driving the disk and the optical pickup 82 for reading a signal recorded on the disk. Specifically, the mechanism control section 83 adjusts the motor speed in accordance with the position of the track indicated by the system control section 93. The mechanism control section 83 also controls an actuator of the optical pickup 82 to move the optical pickup 82. When the accurate track is detected by servo control, the mechanism control section 83 controls the optical disk to wait until a desired physical sector on the rotating optical disk reaches the position of the optical pickup 82. Then, signals are continuously read from the desired position.

The signal processing section 84 processes the signal read from the optical pickup 82 with, for example, amplification, waveform shaping, binarization, demodulation, and error correction to convert the signal into a digital data stream, and then stores the resultant data stream in a buffer memory in the system control section 93 (described below) on a logical block-by-logical block basis.

The AV decoder 85 processes the digital data, which is an input VOB, in a prescribed manner to convert the data into a video signal or an audio signal. Specifically, the AV decoder 85 includes a system decoder 86, a video decoder 87 and an audio decoder 88.

The system decoder 86 receives the digital data stream transferred from the buffer memory on a logical block-by-logical block basis (i.e., on a packet-by-packet basis) and distinguishes a stream ID and a sub stream ID in the header of each packet, thereby classifying the data into a moving picture data pack, an audio data pack and a management information pack. At this point, the moving picture data pack is output to the video decoder 87. Regarding the audio data pack, only the audio data pack having a designated stream number is output to the audio decoder 88 in accordance with a decode stream instruction command sent from the system control section 93. The management information pack is output to the system control section 93. The moving picture data pack input to the video decoder 87 is extended by the prescribed format defined by the MPEG2 format and output as digital video data. Then, the digital video data is converted into a video signal of the NTSC format and externally output. The audio data input to the audio decoder 88 is decoded in the LPCM or AC3 format in accordance with the data type, D/A converted, and then externally output as an audio signal.

The audio decoder 88 processes the digital data, which is an input AOB, in a prescribed manner in accordance with the data type, converts the data into an audio signal, and externally outputs the data.

The system control section 93 includes a working memory and a CPU integrated together and performs overall control of the DVD player.

The reproduction apparatus according to the present invention operates in, for example, the following manner.

When a DVD is loaded on the DVD player, the system control section 93 detects that the DVD is loaded from the optical sensor or the like. Then, the system control section 93 controls the mechanism control section 83 and the signal processing section 84, thereby controlling rotation of the DVD so as to cause the optical pickup 82 to seek to the lead-in region. Thus, the DVD player is initialized and reproduction starts.

For starting the reproduction, the system control section 93 determines whether or not the DVD player is in a video-oriented reproduction mode, by a reproduction mode determination section. When it is determined that the DVD player is in the video-oriented reproduction mode, the system control section 93 reads the video manager based on the information which is read from the volume file management region. The system control section 93 refers to the PGC management information table for the video manager menu to calculate the recording address of the PGC for the volume menu. The resultant PGC is reproduced and retained inside. When the PGC for the volume menu is retained inside, the system control section 93 refers to the retained PGC information to calculate the video object (VOB) to be reproduced and the recording address of the VOB on the optical disk. When the VOB to be reproduced is determined, the system control section 93 outputs a control signal to the mechanism control section 83 and the signal processing section 84 so as to retrieve the determined VOB from the DVD for reproduction. Thus, the video menu from which the user can select the title to be reproduced is displayed.

The user sees the menu and selects and defines the title that he/she is interested in by designating the item number in the menu using the remote controller. Then, the system control section 93 receives the designation of the item number in the menu from the remote controller and refers to the management information pack included in the VOB of the video menu which is being reproduced, the VOB being input from the AV decoder 85, to execute a control command corresponding to the designated number. The control command is PlayTitle #n or the like, and the title number to be reproduced is designated by "n". As an execution operation by the PlayTitle command, the system control section 93 refers to the title search pointer table, which is a part of the audio manager, to determine the audio title set (ATS) to which the designated title belongs to and the title number in the ATS. When the ATS is determined, the system control section 93 outputs a control signal to the mechanism control section 83 and the signal processing section 84 so as to reproduce the ATS management information of the confirmed title set and retrieves the title search pointer table of the ATS which is a part of the ATS management information to the system control section 93. When the title search pointer table is retrieved, the system control section 93 refers to the table to determine the PGC information for starting the reproduction of the title to be reproduced. When the PGC information is determined, the system control section 93 outputs a control signal to the mechanism control section 83 and the signal processing section 84 so as to reproduce the determined PGC information and retain the information in the inside buffer memory for the PGC information. When the PGC information is retained, the system control section 93 refers to the retained PGC information to determine the audio object (AOB) to be reproduced and the recording address thereof. Then, the AOB is reproduced by a control signal output to the mechanism control section 83 and the signal processing section 84 from the system control section 93.

The system control section 93 sequentially determines the AOBs to be reproduced and controls the reproduction thereof in accordance with the retained PGC information. When the reproduction of the final AOB indicated by the PGC information is completed, the system control section 93 searches for the PGC information of the next title and reproduces the AOBs described in the PGC information in the same manner. Thus, the all the titles are reproduced and the operation is stopped. In accordance with specific setting of the DVD player or the DVD, only one title can be reproduced before the operation is stopped, or a menu can be displayed after reproduction of one or more titles is completed.

Next, a method for reproducing a still picture cell, a silent cell and an audio cell will be described in detail.

Figure 19:
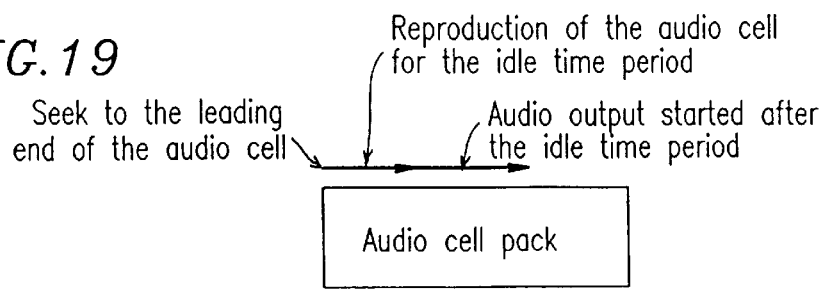
FIG. 19 shows a conventional process for reproducing audio data.
Figure 20:
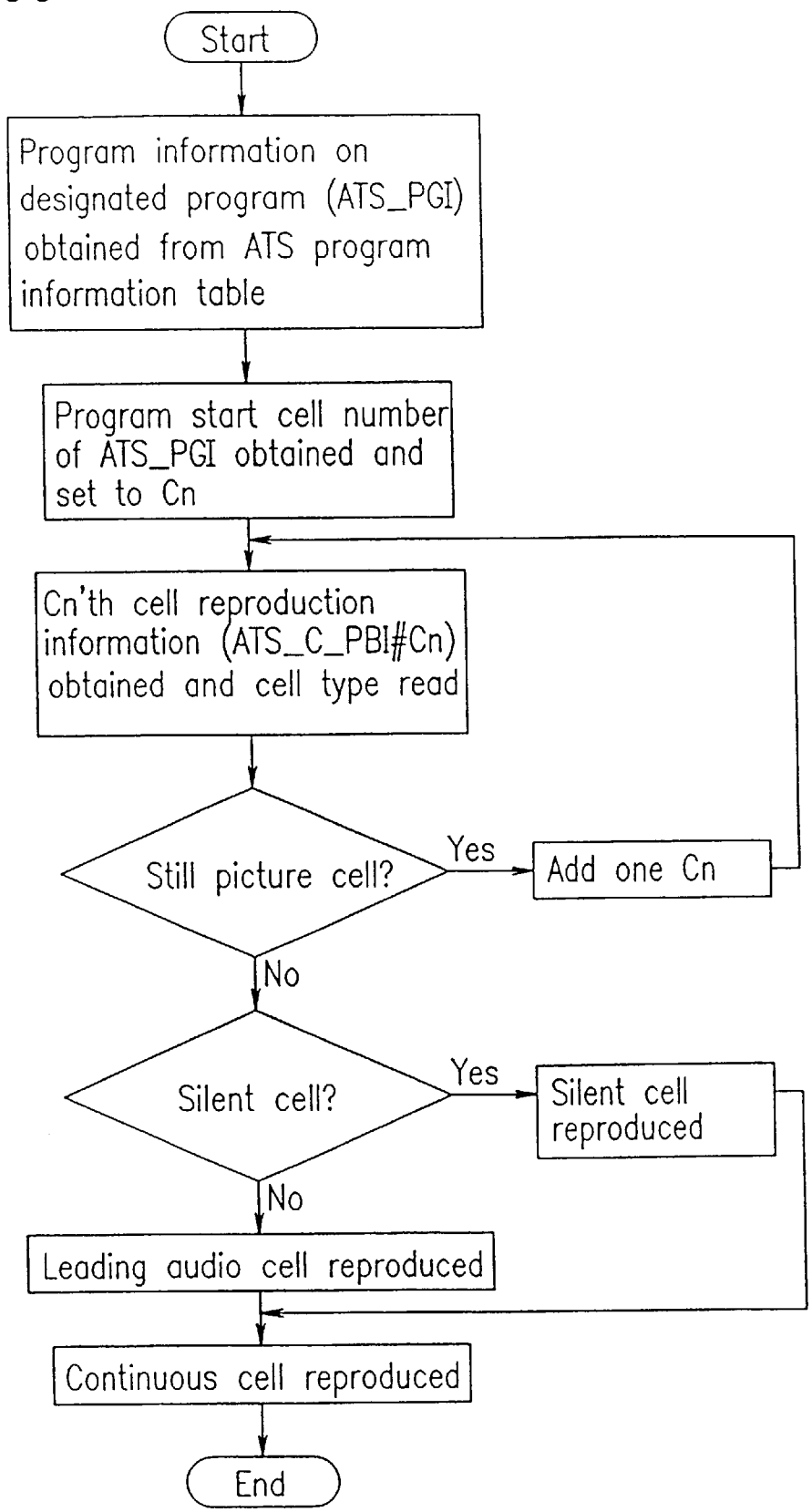
FIG. 20 shows a schematic flow for reproducing a program.
Figure 21:
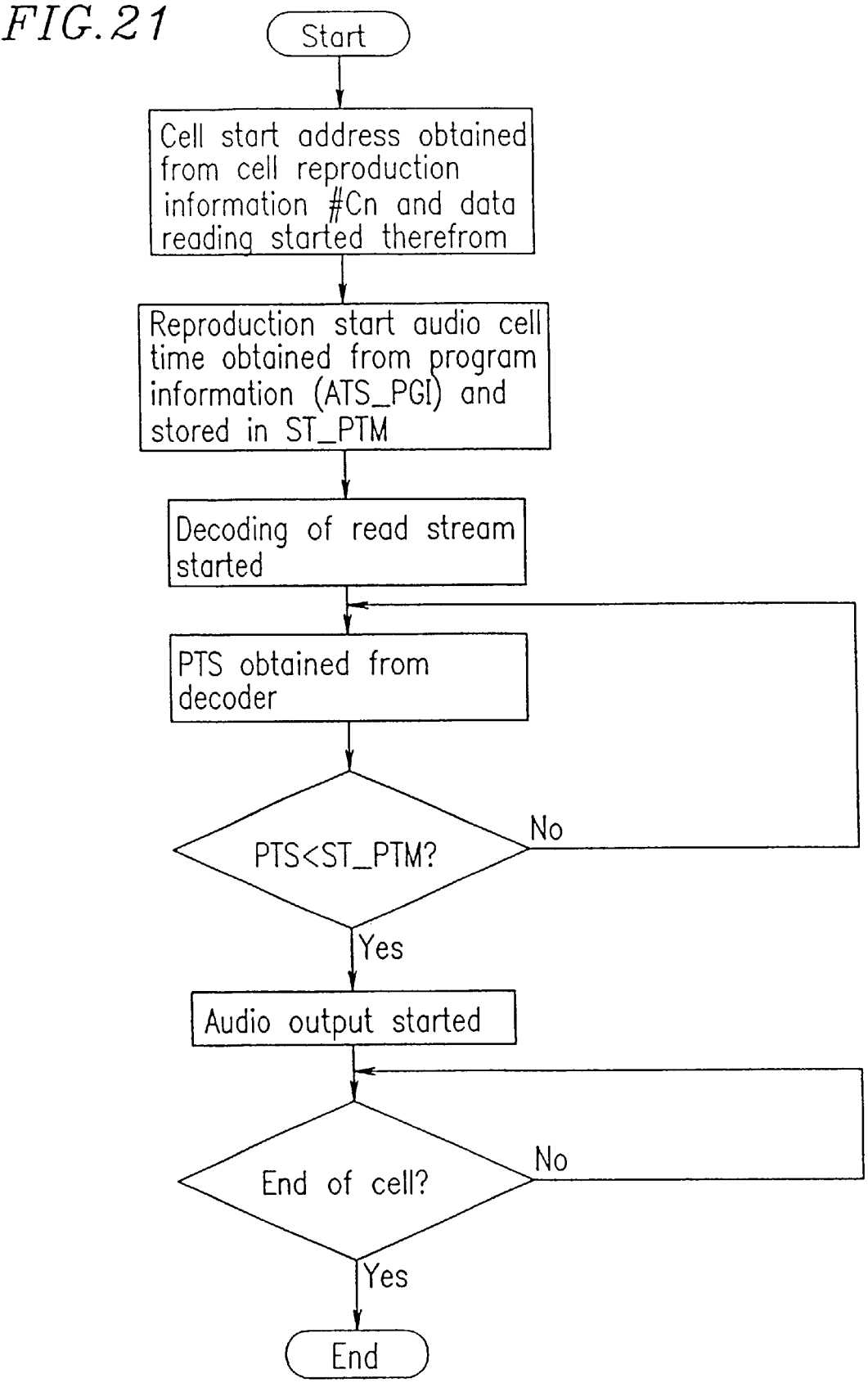
FIG. 21 shows a schematic flow for reproducing a leading audio cell.
Figure 22:
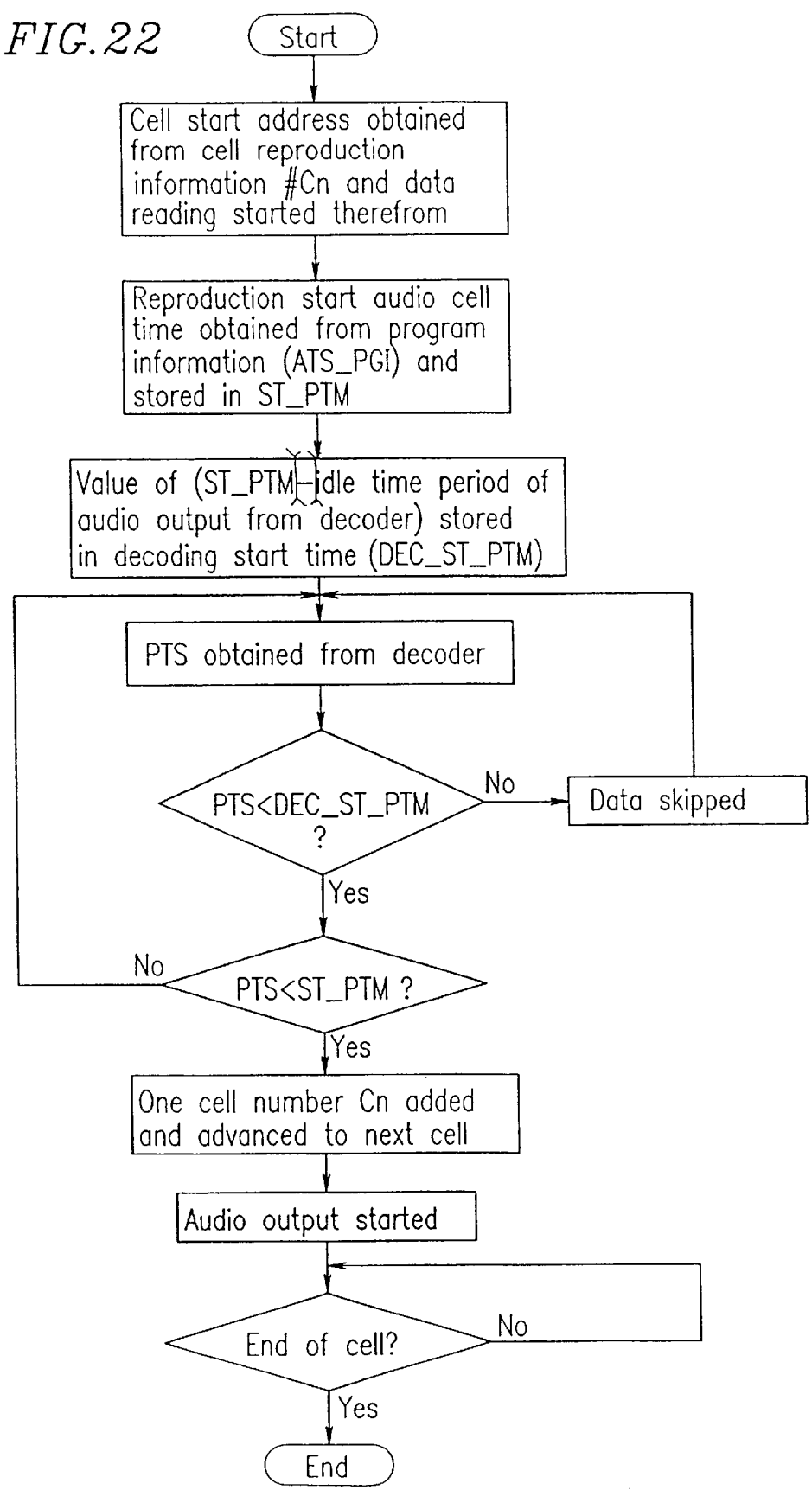
FIG. 22 shows a flow for reproducing a silent cell.
Figure 23:
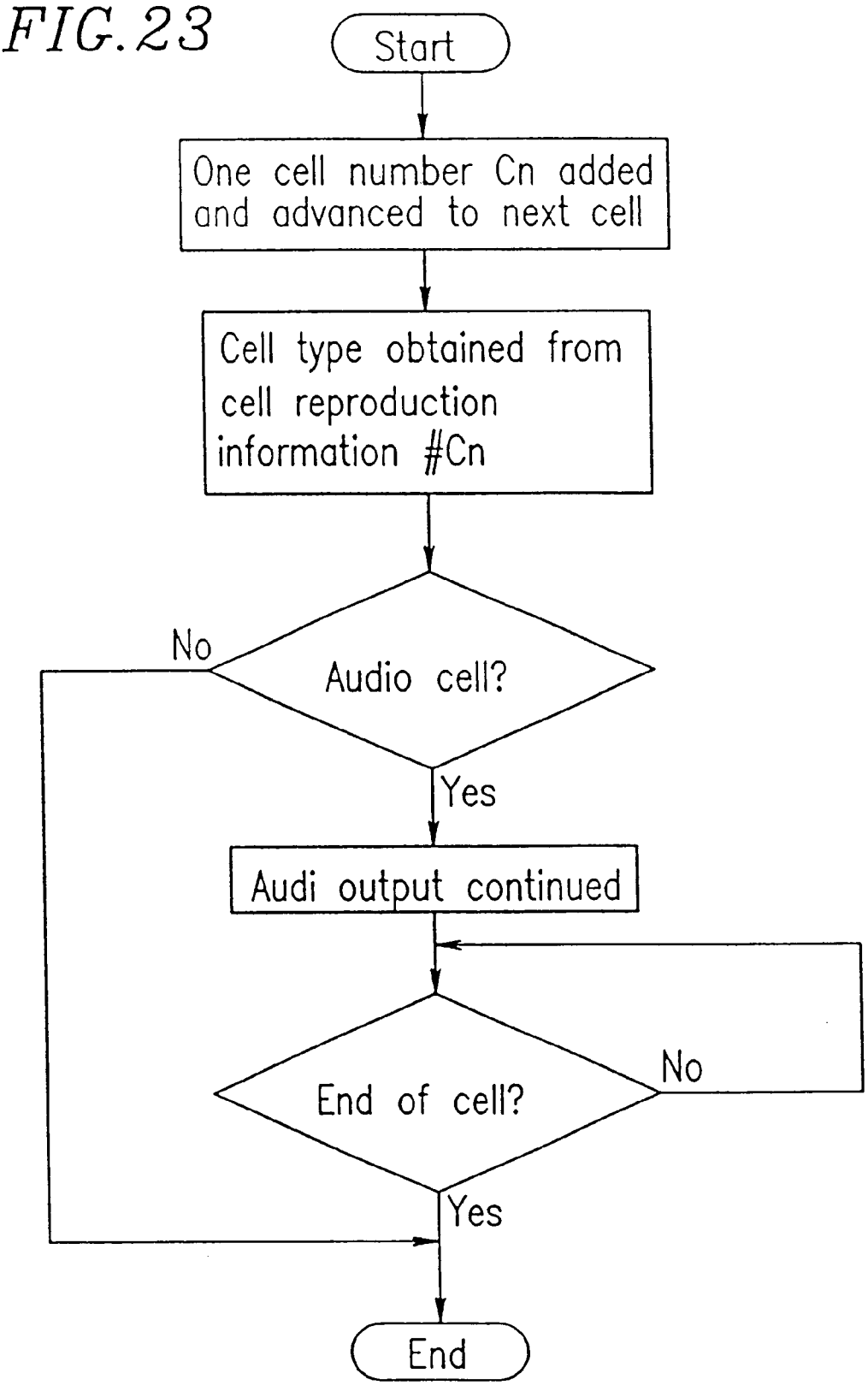
FIG. 23 shows a flow for reproducing a continuously reproduced cell.

FIG. 19 shows a conventional method for reproducing the audio cell. Conventionally, for reproducing an MPEG2 stream, the leading end of the audio cell pack 14 is first sought to and data reading starts. However, audio output does not immediately start but starts after an idle time period, which is predetermined in each reproduction apparatus. The idle time period includes a time period required for determining the PTS of the audio data, a time period required for determining that data is correct, and a time period required for the muting circuit in an analog output section is to be transitioned from a mute state to a non-mute state. Thus, the idle time period varies in accordance with the type of reproduction apparatus. Especially when the reproduction section and the decoder are accommodated in separate chassis, the idle time period tends to be extended because determination on the PTS and the determination on the correctness of the audio data are separately performed.

Figure 17A:
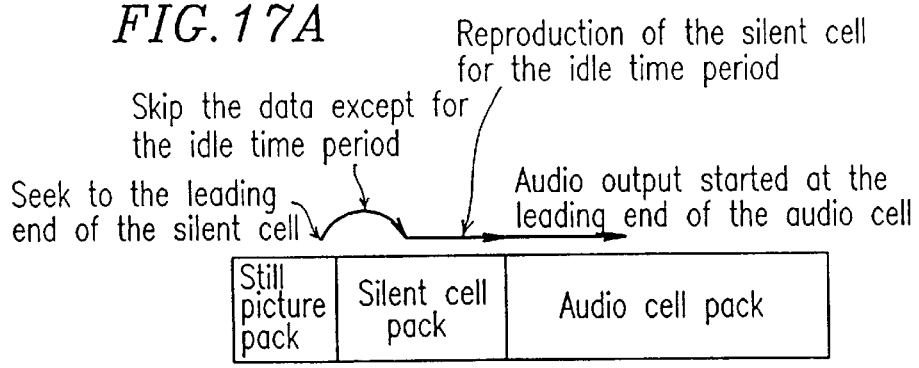
FIG. 17A shows a process for reproducing audio data without displaying a still picture.
Figure 17B:
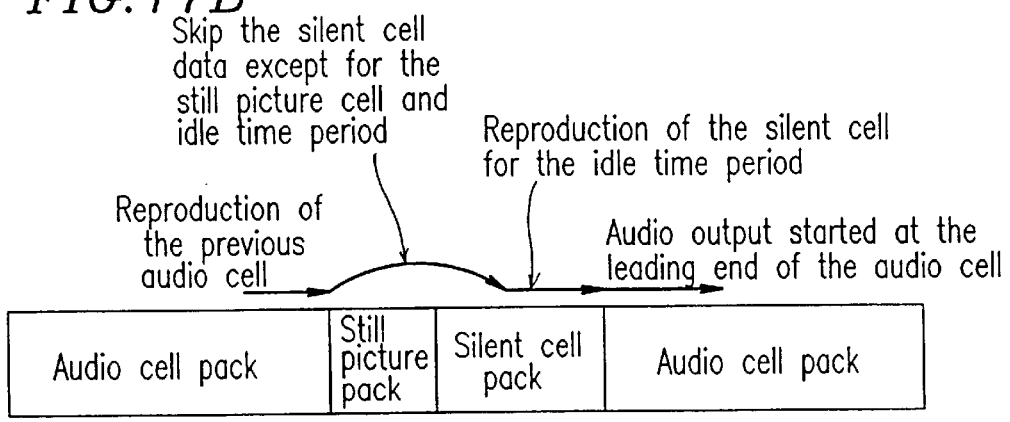
FIG. 17B shows a process for reproducing audio data without displaying a still picture.

FIGS. 17A and 17B show a method for reproducing only audio data without displaying a still picture even though the still picture is included. FIG. 17A shows the method in the case where the reproduction is performed from the leading end of the data, and FIG. 17B shows the method in the case where the reproduction is performed in continuation from the previous cell.

In the case where reproduction is performed from the leading end of the data by selecting a title or program from the menu or the like through jumping, the leading pack of the silent cell is jumped to with reference to the start address of the cell information. At this point, the STC, which is the reference time of the decoder is set with the SCR of the leading pack of the silent cell. Next, skipping and jumping of data corresponding to a prescribed idle time period are performed with reference to the PTS of the silent cell, and the silent cell for the idle time period is reproduced. Audio output is prepared for during this period. At this point, the next title number is not displayed on the display device of the reproduction apparatus, and the passage of reproduction time period is not updated. When the first PTS of the audio cell is detected, audio output is started simultaneously. In the case where the audio output is started and display of the title number and the updating of the passage of the reproduction time period are performed simultaneously when the first PTS of the leading cell is detected, the reproduction apparatus behaves as if the audio data is output simultaneously with the completion of the jump such as menu selection. In the case where the reproduction is performed in continuation from the previous cell, a still picture pack is jumped over and a silent cell is jumped over or skipped except for the idle time period. At this point, by continuously counting the STC, which is reference for the system time, the interval between the completion of the audio output by the previous cell and the start of the audio output by the next cell equals the audio pause time period. The counting of the STC is continued when the physical allocation information and the time attribute information both have a value indicating "continue". When either one of them indicates "no-continue", the same processing as in the jump from the menu is performed, and thus the STC is reset at the leading end of the silent cell pack. Even in the case where there is no still picture cell, the method is substantially the same as described above. In the case where there is no silent cell and the reproduction starts from the leading end of the data, the operation is similar to the conventional operation shown in FIG. 19. In the case where the reproduction is performed in continuation from the previous cell, the operation is as follows. When the time attribute information indicates "continue", the audio cell is decoded as it is continuously from the previous cell and audio data is output. When the time attribute information indicates "no-continue", the operation is the same as the conventional operation shown in FIG. 19 as in the case where the reproduction is performed from the leading end of the data.

Figure 18A:
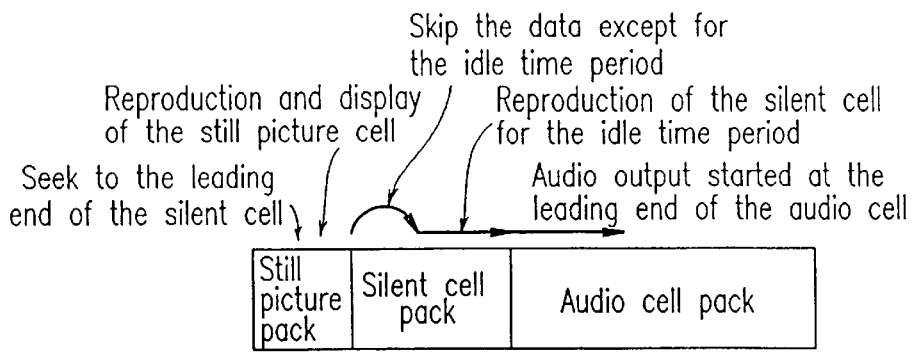
FIG. 18A shows a process for reproducing audio data while displaying a still picture.
Figure 18B:
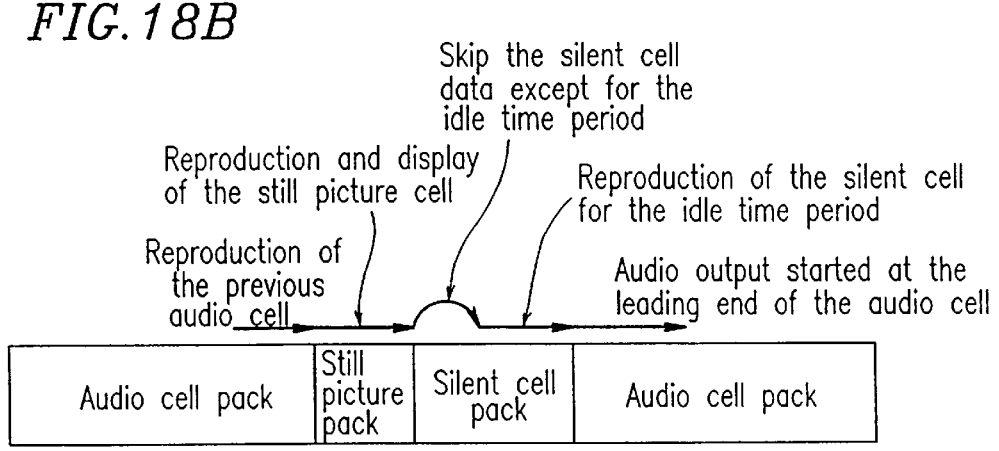
FIG. 18B shows a process for reproducing audio data while displaying a still picture.

FIGS. 18A and 18B show a method for producing the audio data while displaying a still picture. FIG. 18A shows the method in the case where the reproduction is performed from the leading end of the data, and FIG. 18B shows the method in the case where the reproduction is performed in continuation from the previous cell.

In the case where the reproduction is performed from the leading end of the data or by selecting a title or program from the menu or the like through jumping, the pack of the still picture cell is sought to from the cell information. Thus, the still picture cell is read and decoded. At this point, the STC, which is the reference time of the decoder, is set with the SCR of the leading pack of the still picture cell. Next, the leading pack of the silent cell is read. When an STC reaches an STC of the still picture cell, the still picture is displayed. The rest of the operation is the same as the operation when there is no still picture. The display of the still picture can be during the processing of the silent cell, simultaneously with the start of output of the audio cell, or after the start of output of the audio cell in the range permitted by the MPEG2 format. In the case where the reproduction is performed in continuation from the previous cell, the still picture cell is read and decoded when a still picture pack is detected. Next, the silent cell is processed. Whether or not the STC is set depends on the time attribute information as in the case where there is no still picture cell. The rest of the operation is the same as the operation when no still picture is displayed, except that the still picture is displayed when the STC becomes a PTS of the still picture cell and that the STC is set with the SCR of the leading pack of the still picture cell.

FIGS. 20 through 23 are flowcharts each illustrating a program. In the case where the physical allocation information of the program information shows "continue" and the program previously reproduced has a program number which is smaller by one than the program number of the program to be reproduced now, seek to the reading head for the DVD is not specifically necessary. When the time attribute information indicates "continue" and the reproduction is performed in continuation from the previous program, the STC, which is reference time for the decoder, does not need to be reset.

The determination of whether or not the cell is a still picture cell can be performed using the cell type in the cell information or using a still picture flag of the program information. The determination of whether or not the cell is a silent cell is performed by the cell type in the cell information. The determination that the cell is the final cell is performed by comparing the termination address of the cell information and the address read from the data in the DVD. The completion of the reproduction of the program can be determined by the cell index of the cell information returning to zero, the cell type indicating a still picture cell or a silent cell, or the start cell number of the next program in the program information.

The skipping of the silent cell is performed while detecting the PTS when the silent cell is decoded or by obtaining the number of packs to be skipped based on the data rate.

As described above, in the second example according to the present invention, program reproduction information including the start time and reproduction time period of each of audio data based on the reproduction start time of the leading audio data in an MPEG2 stream is recorded in the management region as a part of the reproduction control information. Accordingly, a multimedia information storing medium which realizes reproduction of high quality digital audio data and video data added thereto under a restricted bit rate can be provided. The interval between the reproduced audio data can be uniform even in low-cost reproduction apparatuses or reproduction apparatuses having no reproduction function of video data. Thus, the title creators can prepare data easily.

According to the present invention, the wait time (start-up period) before the start of reproduction of an audio stream can be substantially uniform among a plurality of reproduction apparatuses having different levels of performance such as data processing speed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording medium comprising:
   an audio zone region for storing at least one audio object and audio title set information for managing the reproduction of the at least one audio object,
   wherein each of the at least one audio object includes a plurality of cells, each of the cells containing audio information in the form of an encoded audio stream,
   the audio title set information contains a plurality of sets of reproduction path information each indicating the order of reproducing the at least one audio object,
   the plurality of cells include a silent cell and an audio cell following the silent cell, the silent cell having audio information a variable amount of which is reproduced during a silent period, the audio cell having audio information to be reproduced after the silent period,
   the audio information included in the silent cell and the audio information included in the audio cell have been encoded in accordance with the same encoding type which is selected from a plurality of encoding types; and
   wherein each of the plurality of sets of reproduction path information includes reproduction order information indicating a reproduction order for reproducing the cells, location information indicating the location of each of the plurality of cells on the recording medium, and type information indicating the type of each of the plurality of cells, said types including a silent cell type and an audio cell type.

2. A recording medium according to claim 1, wherein the amount of audio information reproduced from the silent cell varies as a function of a start-up period of an apparatus used to reproduce the at least one audio object from the recording medium.

3. A recording medium according to claim 2, wherein a wait time comprising the start-up period of the apparatus and the duration of the audio information reproduced from the silent cell is substantially the same for a plurality of different apparatuses having different start-up periods.

4. A recording medium according to claim 1, wherein an output level of the audio information included in the silent cell is substantially zero.

5. A recording medium according to claim 1, wherein the silent cell includes a first time stamp and a final time stamp, and the amount of audio information reproduced from the silent cell varies as a function of a comparison of a difference between the first time stamp and the final time stamp and a start-up period of an apparatus used to reproduce the at least one audio object from the recording medium.

6. A recording method for recording information in a recording medium including an audio zone region, comprising the steps of:

storing at least one audio object and audio title set information for managing the reproduction of the at least one audio object in the audio zone region of the recording medium, wherein each of the at least one audio object includes a plurality of cells, each of the cells containing audio information in the form of an encoded audio stream, the audio title set information contains a plurality of sets of reproduction path information each indicating the order of reproducing the at least one audio object, the plurality of cells include a silent cell and an audio cell following the silent cell, the silent cell having audio information a variable amount of which is reproduced during a silent period, the audio cell having audio information to be reproduced after the silent period, the audio information included in the silent cell and the audio information included in the audio cell have been encoded in accordance with the same encoding type which is selected from a plurality of encoding types; and wherein each of the plurality of sets of reproduction path information includes reproduction order information indicating a reproduction order for reproducing the cells, location information indicating the location of each of the plurality of cells on the recording medium, and type information indicating the type of each of the plurality of cells, said types including a silent cell type and an audio cell type.

7. A recording method according to claim 6, wherein the amount of audio information reproduced from the silent cell varies as a function of a start-up period of an apparatus used to reproduce the at least one audio object from the recording medium.

8. A recording method according to claim 7, wherein a wait time comprising the start-up period of the apparatus and the duration of the audio information reproduced from the silent cell is substantially the same for a plurality of different apparatuses having different start-up periods.

9. A recording method according to claim 6, wherein an output level of the audio information included in the silent cell is substantially zero.

10. A recording method according to claim 6, wherein the silent cell includes a first time stamp and a final time stamp, and the amount of audio information reproduced from the silent cell varies as a function of a comparison of a difference between the first time stamp and the final time stamp and a start-up period of an apparatus used to reproduce the at least one audio object from the recording medium.

* * * * *